(12) United States Patent
Elliott et al.

(10) Patent No.: US 11,601,504 B2
(45) Date of Patent: Mar. 7, 2023

(54) WIRELESS TRANSMISSION IN SHARED WIRELESS MEDIUM ENVIRONMENTS

(71) Applicant: Ossia Inc., Redmond, WA (US)

(72) Inventors: Scott Elliott, Snoqualmie Pass, WA (US); Dale Mayes, Bothell, WA (US); Robert Giometti, Bellevue, WA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 17/846,954

(22) Filed: Jun. 22, 2022

(65) Prior Publication Data

US 2022/0329109 A1   Oct. 13, 2022

Related U.S. Application Data

(63) Continuation of application No. 16/868,838, filed on May 7, 2020, now Pat. No. 11,381,114, which is a (Continued)

(51) Int. Cl.
*H04L 67/12* (2022.01)
*H02J 50/20* (2016.01)
(Continued)

(52) U.S. Cl.
CPC ........ *H04L 67/12* (2013.01); *H02J 13/00024* (2020.01); *H02J 13/00026* (2020.01);
(Continued)

(58) Field of Classification Search
CPC ......... H02J 50/80; H02J 50/20; H04W 52/04; H04W 74/085; H04W 84/12; H04L 69/323; H04L 69/324
(Continued)

(56) References Cited

U.S. PATENT DOCUMENTS

| 6,795,418 B2 | 9/2004 | Choi |
| 6,895,255 B1 | 5/2005 | Bridgelall |

(Continued)

FOREIGN PATENT DOCUMENTS

WO   2014031998   2/2014

OTHER PUBLICATIONS

PCT International Search Report and Written Opinion of the International Searching Authority for PCT/US19/32761, dated Jul. 19, 2019, 15 pages.

(Continued)

*Primary Examiner* — Alfonso Perez Borroto
(74) *Attorney, Agent, or Firm* — Amin, Turocy & Watson, LLP

(57) ABSTRACT

Support of coexistence of wireless transmission equipment in shared wireless medium environments is disclosed, which is applicable to various types of wireless transmission equipment. For instance, a wireless power transmission system (WPTS) delivers power to wireless power receiver clients via transmission of wireless power signals using one or more frequencies and/or channels within shared wireless medium environments in which other wireless equipment is operating, such as access points and stations in wireless local area networks (WLANs). The WPTS is configured to co-exist with the operations of the other wireless equipment within the shared wireless medium environment by adapting its transmission operations to utilize frequencies or channels that do not interfere with other equipment and/or implementing co-channel and shared channels operations under which access to channels is implemented using standardized WLAN protocols such as PHY and MAC protocols used for 802.11 (Wi-Fi™) networks.

20 Claims, 26 Drawing Sheets

Related U.S. Application Data continuation of application No. 15/968,679, filed on May 1, 2018, now Pat. No. 10,651,690.

(51) Int. Cl.
| | |
|---|---|
| *H02J 50/80* | (2016.01) |
| *H04W 52/04* | (2009.01) |
| *H02J 13/00* | (2006.01) |
| *H04W 74/08* | (2009.01) |
| *H04L 69/324* | (2022.01) |
| *H04L 69/323* | (2022.01) |
| *H04W 84/12* | (2009.01) |
| *H02J 7/00* | (2006.01) |

(52) U.S. Cl.
CPC ........ *H02J 13/00028* (2020.01); *H02J 50/20* (2016.02); *H02J 50/80* (2016.02); *H04W 52/04* (2013.01); *H02J 7/0013* (2013.01); *H04L 69/323* (2013.01); *H04L 69/324* (2013.01); *H04W 74/085* (2013.01); *H04W 84/12* (2013.01)

(58) Field of Classification Search
USPC .......................................................... 307/104
See application file for complete search history.

(56) References Cited

U.S. PATENT DOCUMENTS

| | | | |
|---|---|---|---|
| 9,402,269 | B2 | 7/2016 | Cavalcanti |
| 9,887,589 | B2 | 2/2018 | Williams et al. |
| 9,941,749 | B2 * | 4/2018 | Jeong ................... H02J 50/402 |
| 10,027,179 | B1 | 7/2018 | Bello et al. |
| 11,381,114 | B2 * | 7/2022 | Elliott ............... H02J 13/00026 |
| 2002/0135513 | A1 | 9/2002 | Paschen et al. |
| 2003/0157951 | A1 | 8/2003 | Hasty |
| 2005/0117530 | A1 | 6/2005 | Abraham |
| 2005/0142957 | A1 | 6/2005 | Bystrom |
| 2006/0043915 | A1 | 3/2006 | Kim |
| 2006/0215601 | A1 | 9/2006 | Vleugels et al. |
| 2009/0096413 | A1 | 4/2009 | Partovi et al. |
| 2010/0124937 | A1 | 5/2010 | Vogel et al. |
| 2011/0002302 | A1 | 1/2011 | Ding et al. |
| 2013/0049732 | A1 | 2/2013 | Kulkarni et al. |
| 2013/0051446 | A1 | 2/2013 | Vijayasankar et al. |
| 2013/0300206 | A1 * | 11/2013 | Kim ..................... H04B 5/0037 |
| | | | 307/104 |
| 2014/0044110 | A1 | 2/2014 | Banerjea |
| 2014/0266031 | A1 | 9/2014 | Sasaki |
| 2015/0334706 | A1 | 11/2015 | Mukherjee |
| 2017/0208597 | A1 * | 7/2017 | Gollakota ......... H04W 72/0473 |
| 2017/0228626 | A1 | 8/2017 | Nikunen et al. |
| 2017/0256994 | A1 * | 9/2017 | Joyce ..................... H02J 50/90 |
| 2017/0302109 | A1 | 10/2017 | Lee et al. |
| 2017/0373725 | A1 | 12/2017 | Lee et al. |
| 2018/0084406 | A1 | 3/2018 | Tandai et al. |
| 2018/0167949 | A1 | 6/2018 | Del Carpio Vega et al. |

OTHER PUBLICATIONS

PCT International Search Report and Written Opinion of the International Searching Authority for PCT/US19/29587, dated Jul. 10, 2019, 18 pages.

U.S. Appl. No. 15/992,055 Non-final Office Action, dated Jul. 19, 2019, 27 pages.

U.S. Appl. No. 15/992,055 Final Office Action, dated Oct. 31, 2019, 29 Pages.

"LTE Aggregation & Unlicensed Spectrum." 4G Americas. Nov. 2015.

Holland-Jorgensen, Toke, et al. "Ending the anomaly: Achieving low latency and airtime fairness in WiFi." 2017 USENIX Annual Technical Conference (USENIX ATC 17). USENIX Association, Santa Clara, CA. 2017.

Joshi, Tarun, et al. "Airtime fairness for IEEE 802.11 multirate networks." IEEE Transactions on Mobile Computing 7.4 (2008): 513-527.

IEEE Std 802.11-2012: Part 11: Wireless LAN Medium Access Control (MAC) and Physical Layer (PHY) Specifications, Mar. 2012, Sections 16-18.

Notice of Allowance dated Apr. 6, 2020 for U.S. Appl. No. 15/992,055, 19 pages.

Office Action dated Sep. 17, 2019 for U.S. Appl. No. 15/968,679, 44 pages.

Office Action dated Jul. 16, 2021 for U.S. Appl. No. 16/868,838, 38 pages.

Notice of Allowance dated Nov. 15, 2021 for U.S. Appl. No. 16/868,838, 47 pages.

Notice of Allowance dated Mar. 3, 2022 for U.S. Appl. No. 16/868,838, 75 pages.

\* cited by examiner

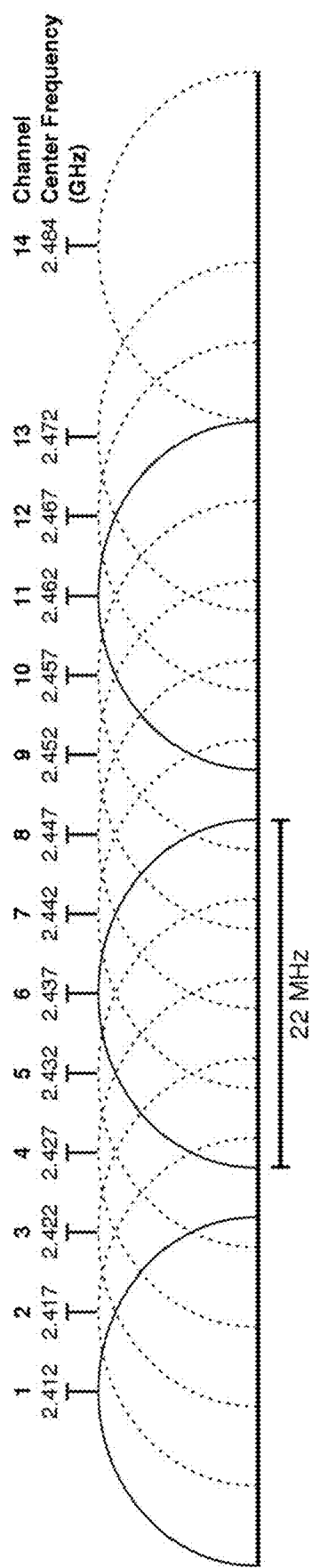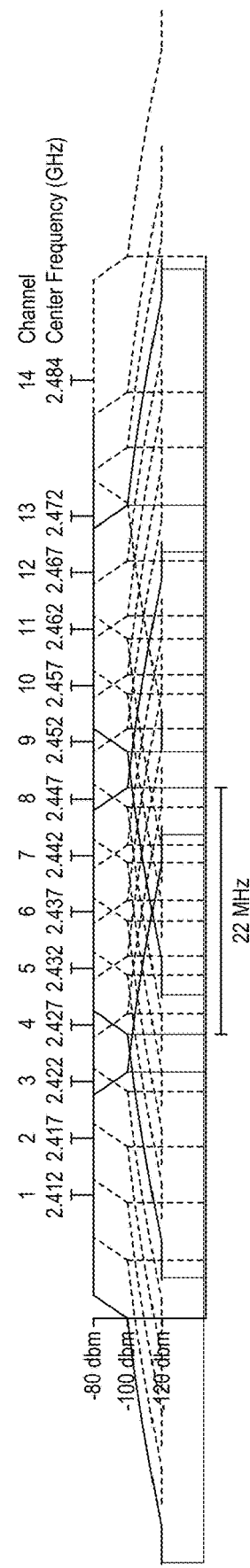
FIG. 9A (Prior Art)
FIG. 9B (Prior Art)

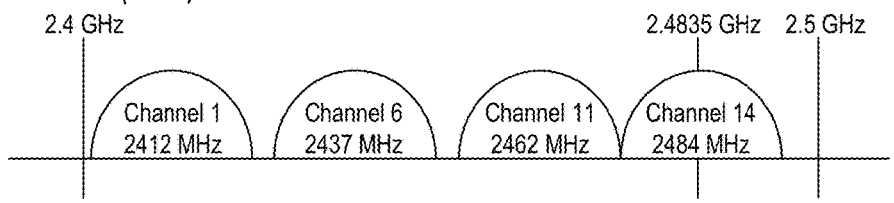
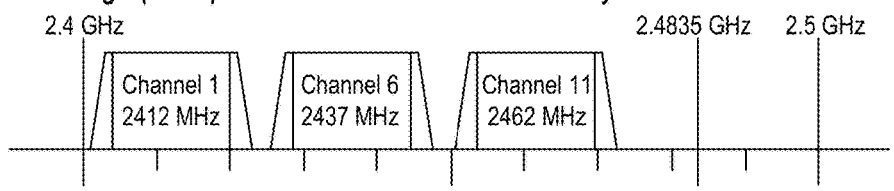
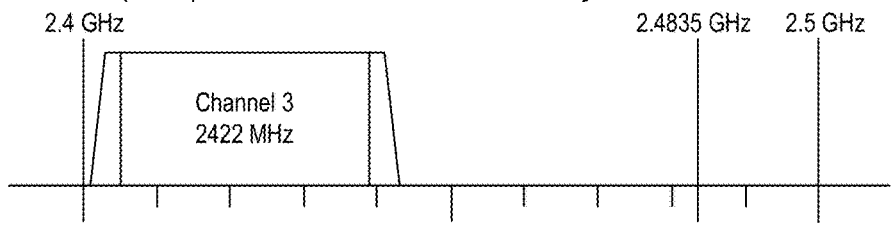
FIG. 10A
*(Prior Art)*
FIG. 10B
*(Prior Art)*
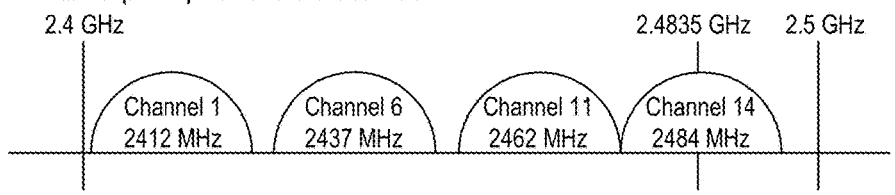
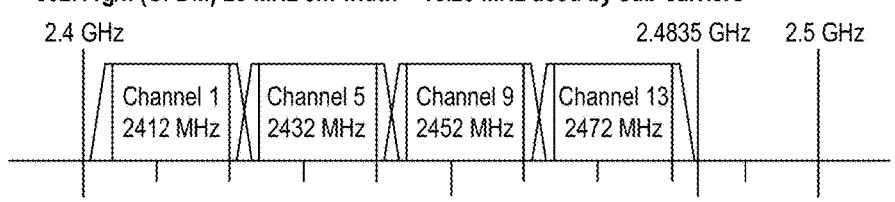
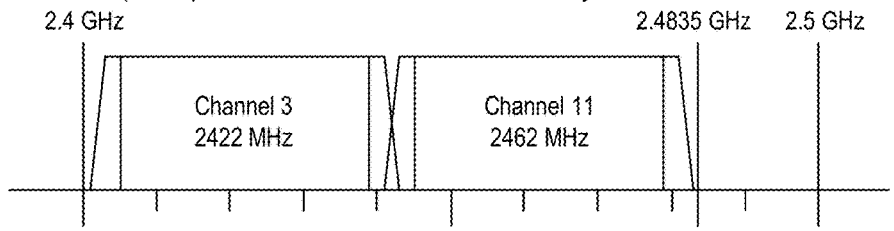

| PHY | SIFS* | Slot Time* | PIFS | DIFS |
|---|---|---|---|---|
| HR/DSSS (802.11b) | 10 μs | 20 μs | 30 μs | 50 μs |
| ERP (802.11g) | 10 μs | Long = 20 μs<br>Short = 9 μs | Long = 30 μs<br>Short = 19 μs | Long = 50 μs<br>Short = 28 μs |
| OFDM (802.11a) | 16 μs | 9 μs | 25 μs | 34 μs |
| HT (802.11n) | 10 μs - 2.4 GHz<br>16 μs - 5 GHz | Long = 20 μs - 2.4 GHz<br>Short = 9 μs - 2.4 GHz<br>9 μs - 5 GHz | Long = 20 μs - 2.4 GHz<br>Short = 9 μs - 2.4 GHz<br>25 μs - 5 GHz | Long = 50 μs - 2.4 GHz<br>Short = 28 μs - 2.4 GHz<br>34 μs - 5 GHz |

WIRELESS TRANSMISSION IN SHARED WIRELESS MEDIUM ENVIRONMENTS

RELATED APPLICATIONS

The present application is a continuation of, and claims priority to each of, U.S. patent application Ser. No. 16/868,838, filed May 7, 2020, entitled "WIRELESS TRANSMISSION IN SHARED WIRELESS MEDIUM ENVIRONMENTS," which is a continuation of U.S. patent application Ser. No. 15/968,679, filed on May 1, 2018, entitled "WIRELESS TRANSMISSION IN SHARED WIRELESS MEDIUM ENVIRONMENTS," and issued as U.S. Pat. No. 10,651,690 on May 12, 2020, which priority applications are hereby incorporated herein by reference in their respective entireties and for all purposes.

BACKGROUND

The use of wireless communication in today's environments is ubiquitous. It seems that everyone has at least one "smart" wireless device, such as a smart phone or tablet, and many have other types of mobile computing devices, such as laptops, notebooks, Chromebooks, etc., that support wireless communication. In addition to cellular and mobile computing, wireless communication technologies are used for other purposes, such as audio systems, portable telephone systems, screen casting, and peer-to-peer communication to name a few.

The most common wireless technologies include Wireless Wide Area Networks (WWAN) (e.g., LTE, HSPA+, UMTS, GPRS, generally associated with cellular networks), Wireless Local Area Networks (WLAN), including Institute of Electrical and Electronics Engineers (IEEE) 802.11a, 802.11b, 802.11g, 802.11n, 802.11ac standards (commonly referred to as Wi-Fi™ WLANs) and Wireless Personal Area Networks (WPAN), such as Bluetooth™. There are also wireless standards such as ZigBee™ that are used for Wireless Sensor Actor Networks (WSAN).

The radio frequency (RF) (radio) bands used by the various wireless networks can be generally classified into two categories: licensed, and unlicensed. Most cellular networks operate in licensed bands, while most WLANs, WPANs, and WSANs operate using unlicensed bands. Some common radio bands are collectively referred to as industrial, scientific, and medical (ISM) bands, which include operations at 2.4 GHz to 2.5 GHz (commonly referred to as 2.4 GHz or 2450 MHz bands), and 5.725 GHz to 5.875 GHz (commonly referred to as 5.8 GHz or 5800 MHz bands). ISM bands generally may be used for unlicensed operation, although there are some licensed users for some of these bands.

Substantially all of the forgoing wireless devices are or can be powered by rechargeable batteries. Conventional rechargeable battery chargers require access to a power source such as an alternating current (AC) power outlet, which may not always be available or convenient. There have recently been techniques introduced for so-called "wireless" charging using magnetic or inductive charging-based solutions in which the wireless device is placed in close proximity to the charging unit. However, during charging the wireless device must (generally) be placed on the charging base Wireless power transmission at larger distances often use more advanced mechanisms, such as transmission via radio frequency (RF) signals, ultrasonic transmissions, and laser powering, to name a few, each of which present a number of unique hurdles to commercial success. Wireless power transmission systems (WPTS) employing RF signals may utilize portions of the licensed RF spectrum, including 2.4 GHz and 5 GHz radio bands. This presents a problem when operating in shared wireless medium environments under which other equipment and devices, such as WLAN access points and stations, are operating using the same or overlapping radio bands. In particular, transmission of wireless power signals in such shared wireless medium environments may interfere with data transmissions within WLANs. Accordingly, there is a need for solutions that enable a WPTS to coexist with existing equipment when operating in shared wireless medium environments. More generally, transmissions of signals using Physical Layers (PHYs) operating using the same or overlapping radio bands presents similar problems.

The examples provided herein of some prior or related systems and their associated limitations are intended to be illustrative and not exclusive. Other limitations of existing or prior systems will become apparent to those of skill in the art upon reading the following detailed description.

BRIEF DESCRIPTION OF THE DRAWINGS

The foregoing aspects and many of the attendant embodiments described herein will become more readily appreciated as the same becomes better understood by reference to the following detailed description, when taken in conjunction with the accompanying drawings, wherein like reference numerals refer to like parts throughout the various views unless otherwise specified:

FIG. 9A is a diagram illustrating the channel spacing for IEEE 802.11b and 802.11g WLANs;

FIG. 9B is a diagram illustrating a spectral mask defining the permitted power distribution across each channel for IEEE 802.11g WLANs.

FIG. 10A is a diagram showing non-overlapping channels for 2.4 GHz WLANs in the United States;

FIG. 10B is a diagram showing non-overlapping channels for 2.4 GHz WLANs in most countries outside of the United States;

DETAILED DESCRIPTION

Figure 1:
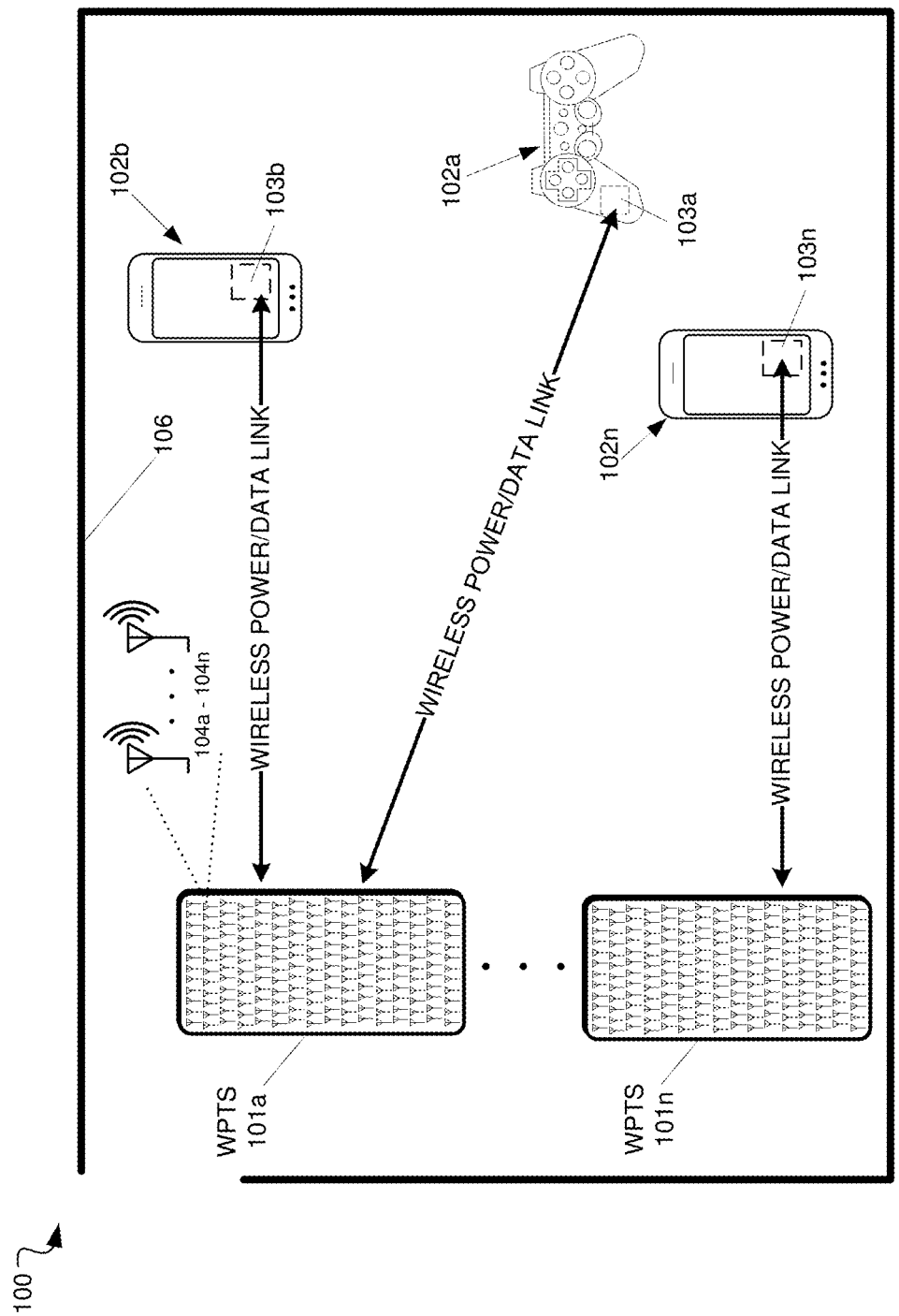
FIG. 1 depicts an example wireless power delivery environment illustrating wireless power delivery from one or more wireless power transmission systems to various wireless devices within the wireless power delivery environment in accordance with some embodiments.

Embodiments of methods, apparatus and systems supporting coexistence of wireless transmission equipment in shared wireless medium environments are described herein.

In the following description, numerous specific details are set forth (such as implementation using IEEE 802.11-based WLANs) to provide a thorough understanding of embodiments of the subject application. One skilled in the relevant art will recognize, however, that the embodiments of the subject application can be practiced without one or more of the specific details, or with other methods, components, materials, etc. In other instances, well-known structures, materials, or operations are not shown or described in detail to avoid obscuring aspects of the embodiments of the subject application.

Reference throughout this specification to "one embodiment" or "an embodiment" means that a particular feature, structure, or characteristic described in connection with the embodiment is included in at least one embodiment of the present application. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

In accordance with aspects of some embodiments disclosed herein, solutions are provided that enable a wireless power transmission system to coexist with other equipment operating within a shared wireless medium environment. For example, under some embodiments, power transmission signals employed by a WPTS are transmitted in a manner that enables the WPTS to coexist with WLAN equipment utilizing one or more channels in an unlicensed radio band, such as 2.4 GHz, 5 GHz and 5.8 GHz radio bands. However, the teaching and principles disclosed herein are not limited to WLANs or these radio band, but rather may generally apply to solutions to facilitate coexistence of WPTS equipment in various types of shared wireless medium environments utilizing unlicensed or licensed radio bands.

Definitions

Wireless Network: two or more nodes (i.e., wireless-enabled devices) that communicate wirelessly using RF signals that are transmitted over a shared wireless media.

PHY: Physical Layer used for transmitting signals or associated protocol operating at the Physical Layer.

MAC: Media Access Channel Layer or associated protocol operating at the MAC Layer.

Radio Band: A range of RF frequencies.

Channel: A specific radio frequency or radio band used for wireless transmission.

Non-interfering Channel: Channel that uses a frequency band and/or PHY signaling that is defined or otherwise designed to not interfere with another channel; includes non-overlapping channels for IEEE 802.11 WLANs.

Co-channel networks: Two or more networks transmitting signals using the same channel.

Co-frequency networks: Two or more networks transmitting signals using the same frequency and/or operating at channels having some frequency overlap. This is similar to co-channel networks except the channel number and width for one PHY used by one network may be different to the PHY used by another network.

Reservation: A time slot reserved by a wireless network node for transmission over a particular channel.

Energy Detect (ED): Detection of RF signal energy level above a threshold for a particular wireless protocol/standard.

Shared Wireless Medium Environment: Environments in which two of more wireless devices share access to the same channel or environments including two or more wireless networks having overlapping coverage areas and operating in the same or similar radio bands (e.g., 2.4 GHz, 5 GHz, etc.)

The terms "coexist" and "coexistence" in shared wireless medium environments generally mean that equipment being operated in the shared wireless medium environment do not interfere with the operation of other wireless equipment that is operating in the environment. Non-interfering operations may generally be implemented by using a non-overlapping channel (if available), or implementing a scheme for sharing a channel (i.e., co-channel or co-frequency operation) used by another wireless network. Another aspect of coexistence relates to the concept of "fair" sharing of the medium, which is applicable when multiple networks share a channel (sharing between networks) or when multiple devices share access to the same network (e.g., WLAN stations sharing access within a WLAN). (It is noted that when networks in shared wireless medium environments are operating under non-overlapping channels, the aspect of fair sharing is met by default, since there is no need to share the channel.)

To facilitate coexistence in shared wireless medium environments, various wireless standards have been developed, including standards developed by the IEEE (e.g., IEEE 802.11 standards, IEEE 802.16 (WiMAX™), and IEEE 802.15.4 Zigbee™ standard), the Bluetooth Special Interest Group (SIG), the 3GPP ($3^{rd}$ Generation Partnership Project), and the European Telecommunications Standards Institute (ETSI), and others. Aspects of interoperability of devices implementing the IEEE 802.11a, 802.11b, 802.11g, 802.11n, 802.11ac WLAN standards are managed by the Wi-Fi Alliance™, which is a worldwide network of companies that manufacture Wi-Fi™ equipment and components.

Additional oversight may also be provided on a country or regional basis by commissions and agencies or the like. For example, in the United States, the Federal Communication Commission (FCC) has oversight over wireless device operations in both licensed and unlicensed radio bands. With respect to coexistence, the FCC has established rules for unlicensed devices that are designed to prevent harmful interference to authorized radio services through limits on transmitter power and spurious emissions. The Wi-Fi™ Bluetooth™, and Zigbee™ standards have been developed within the framework of these rules, generally with the intention of ensuring cooperative sharing of the spectrum by unlicensed devices while recognizing that such devices are not protected from interference.

In addition to the foregoing, the IEEE 802.19 Wireless Coexistence Working Group (WG) has been developing standards for coexistence between wireless technologies used by unlicensed devices. The IEEE 802.19 WG reviews coexistence assurance (CA) documents produced by working groups developing new wireless standards for unlicensed devices.

To better understand how to implement a WPTS to coexist in shared wireless medium environments, an overview of the operation and architecture of exemplary WPTS embodiments is now presented.

I. Wireless Power Transmission System Overview/Architecture

FIG. 1 depicts a block diagram including an example wireless power delivery environment 100 illustrating wireless power delivery from one or more wireless power transmission systems (WPTS) 101*a-n* (also referred to as "wireless power delivery systems", "antenna array systems" and "wireless chargers") to various wireless devices 102*a-n* within the wireless power delivery environment 100, according to some embodiments. More specifically, FIG. 1 illustrates an example wireless power delivery environment 100 in which wireless power and/or data can be delivered to available wireless devices 102*a*-102*n* having one or more wireless power receiver clients 103*a*-103*n* (also referred to herein as "clients" and "wireless power receivers"). The wireless power receiver clients are configured to receive and process wireless power from one or more wireless power transmission systems 101*a*-101*n*. Components of an example wireless power receiver client 103 are shown and discussed in greater detail with reference to FIG. 4.

As shown in the example of FIG. 1, the wireless devices 102*a*-102*n* include mobile phone devices and a wireless game controller. However, the wireless devices 102*a*-102*n* can be any device or system that needs power and is capable of receiving wireless power via one or more integrated power receiver clients 103a-103n. As discussed herein, the one or more integrated power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102. In some embodiments, the antennas are adaptively-phased radio frequency (RF) antennas. The wireless power transmission system 101 is capable of determining the appropriate phases with which to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used to include related and peripheral circuitry for signal generation, reception and transmission, such as radios, digital logic and modems. In some embodiments, the wireless power transmission system 101 can have an embedded Wi-Fi™ hub for data communications via one or more antennas or transceivers.

The wireless devices 102 can include one or more receive power clients 103. As illustrated in the example of FIG. 1, power delivery antennas 104a-104n are shown. The power delivery antennas 104a are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the power receiver clients 103a-103n and/or the wireless devices 102a-102n. In some embodiments, the data communication antennas can communicate via Bluetooth™, Wi-Fi™ (including but not limited to IEEE 802.11a, 802.11b, 802.11g, 802.11n, 802.11ac), ZigBee™, etc. Other data communication protocols are also possible.

Each power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each of the wireless power transmission systems 101a-101n is capable of determining the appropriate phases for delivering the coherent signals to the power receiver clients 102a-102n. For example, in some embodiments, coherent signals can be determined by computing the complex conjugate of a received beacon (or calibration) signal at each antenna of the array such that the coherent signal is phased for delivering power to the particular power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary alternating current (AC) power supply in a building. Alternatively, or additionally, one or more of the wireless power transmission systems 101a-101n can be powered by a battery or via other mechanisms, e.g., solar cells, etc.

The power receiver clients 102a-102n and/or the wireless power transmission systems 101a-101n are configured to operate in a multipath wireless power delivery environment. That is, the power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the power receiver client.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, an Android device, an iPhone, and/or a tablet, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the power receiver clients 103a-103n can each include a data communication module for communication via a data channel. Alternatively, or additionally, the power receiver clients 103a-103n can direct the wireless devices 102.1-102.n to communicate with the wireless power transmission system via existing data communications modules. In some embodiments the beacon signal, which is primarily referred to herein as a continuous waveform, can alternatively or additionally take the form of a modulated signal.

Figure 2:
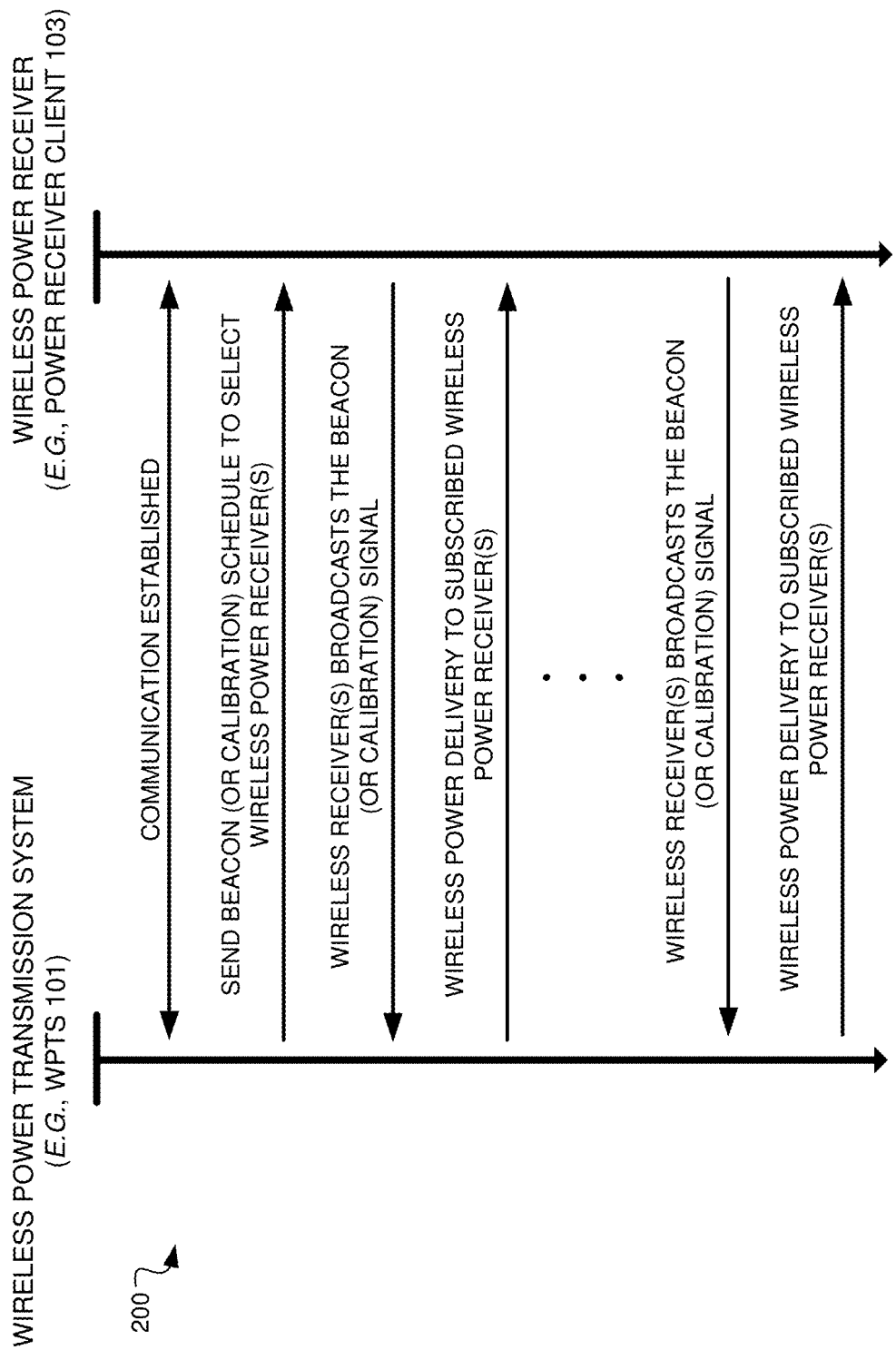
FIG. 2 depicts a sequence diagram illustrating example operations between a wireless power transmission system and a wireless receiver client for commencing wireless power delivery in accordance with some embodiments.

FIG. 2 is a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select power receiver clients 103. The wireless power transmission system 101 can also send power transmission scheduling information so that the power receiver client 103 knows when to expect (e.g., a window of time) wireless power from the wireless power transmission system. The power receiver client 103 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 103 include one or more antennas (or transceivers) which have a radiation and reception pattern in three-dimensional space proximate to the wireless device 102 in which the power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the power receiver client 103 via the same path over which the beacon signal was received from the power receiver client 103.

In some embodiments, the wireless power transmission system 101 includes many antennas; one or more of which are used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the client device via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client at the wireless power transmission system and, in turn, responding with wireless power directed to that particular client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
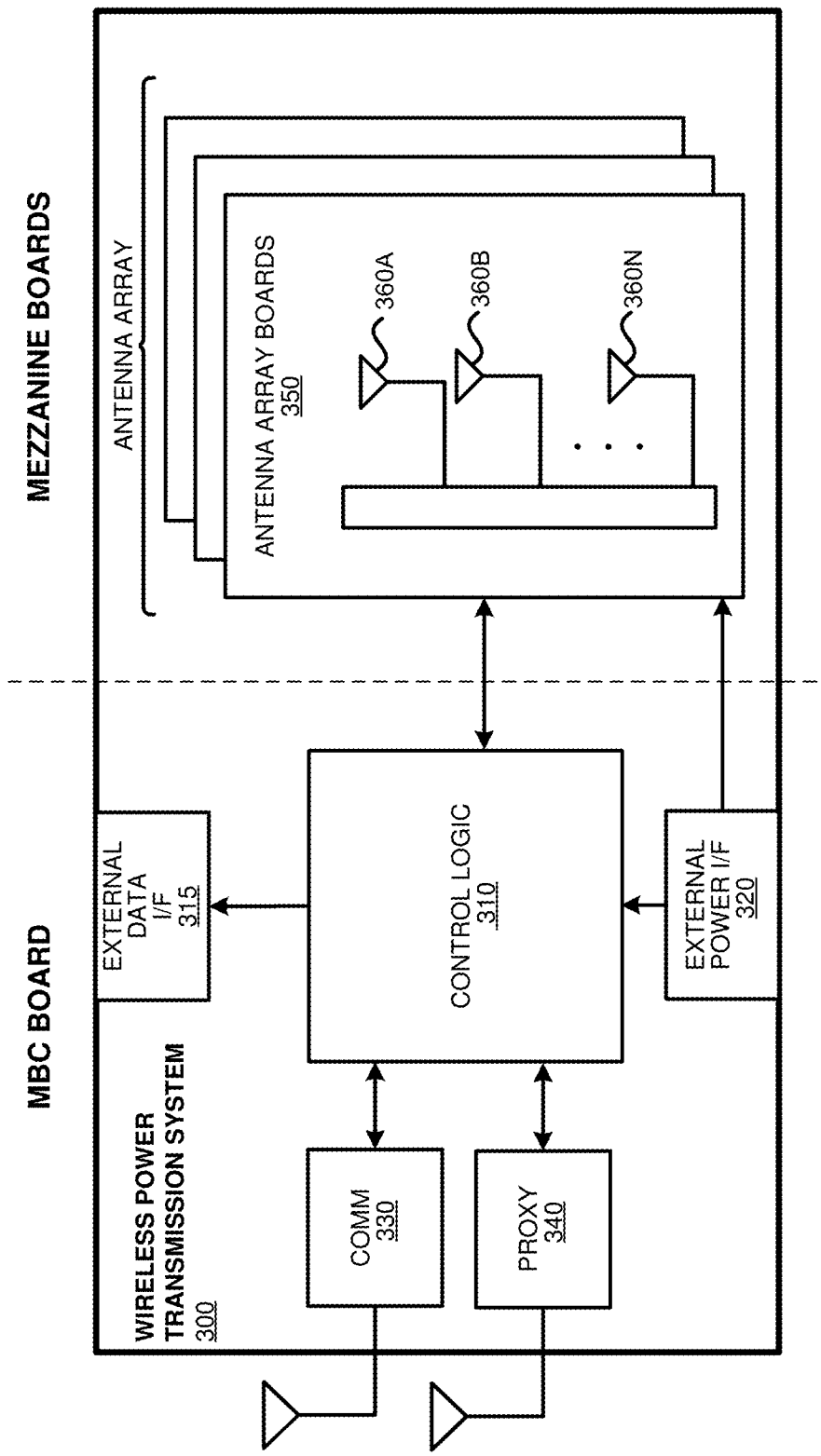
FIG. 3 depicts a block diagram illustrating example components of a wireless power transmission system in accordance with some embodiments.

FIG. 3 is a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™ Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™ ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the master bus controller (MBC), which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
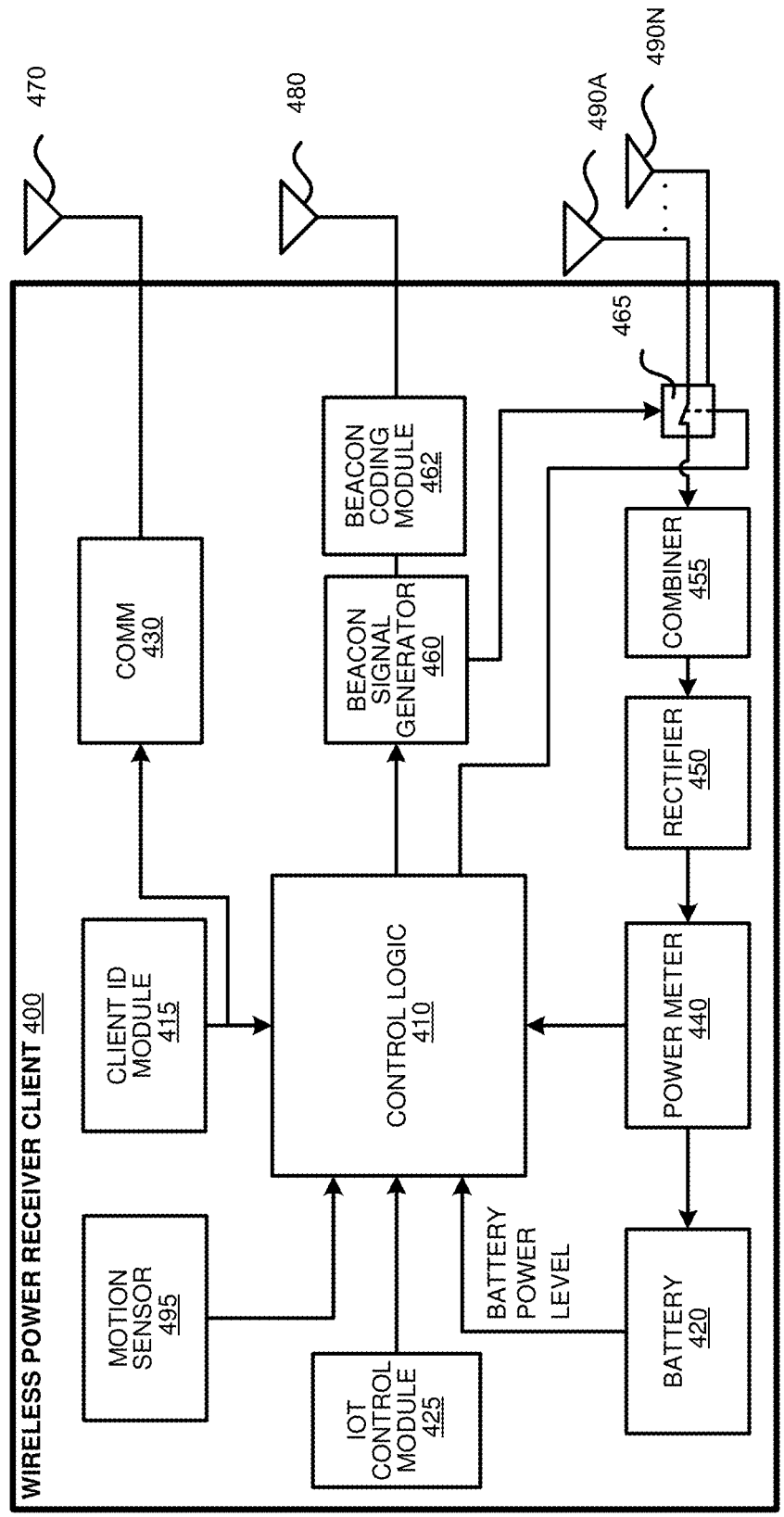
FIG. 4 depicts a block diagram illustrating example components of a wireless power receiver client in accordance with some embodiments.

FIG. 4 is a block diagram illustrating example components of a wireless power receiver client, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 can receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client is embedded, usage information of the device in which the wireless power receiver client is embedded, power levels of the battery or batteries of the device in which the wireless power receiver client is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the power receiver client in a wireless power delivery environment. For example, the ID can be transmitted to one or more wireless power transmission systems when communication is established. In some embodiments, power receiver clients may also be able to receive and identify other power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
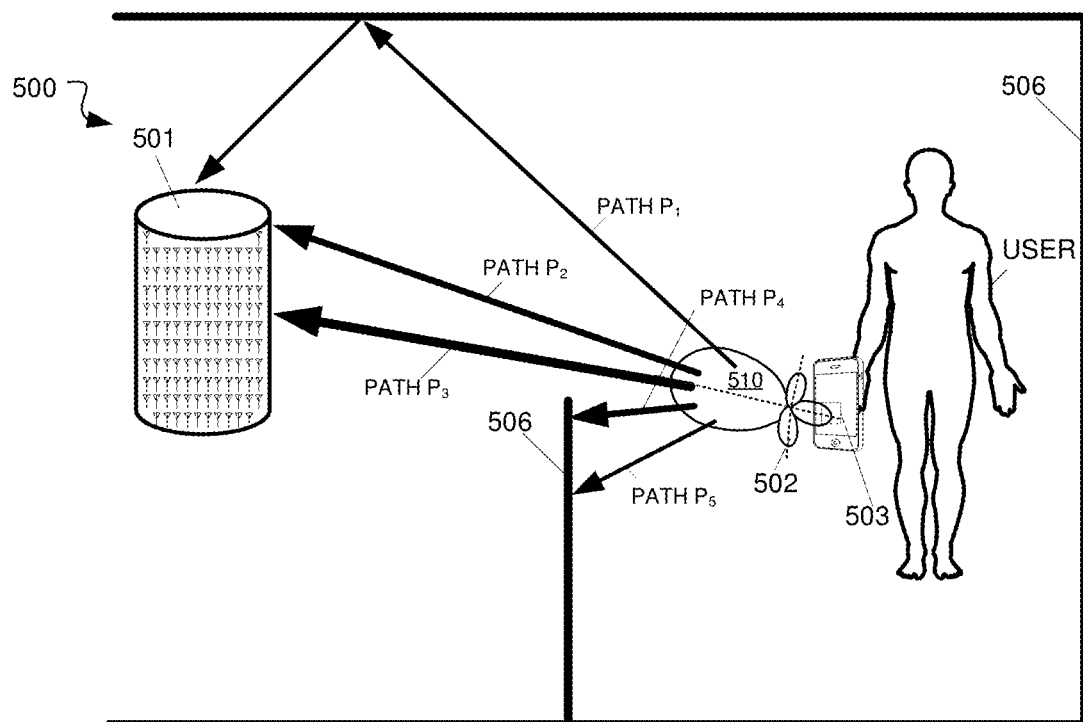
FIGS. 5A and 5B depict diagrams illustrating an example multipath wireless power delivery environment in accordance with some embodiments.
Figure 5B:
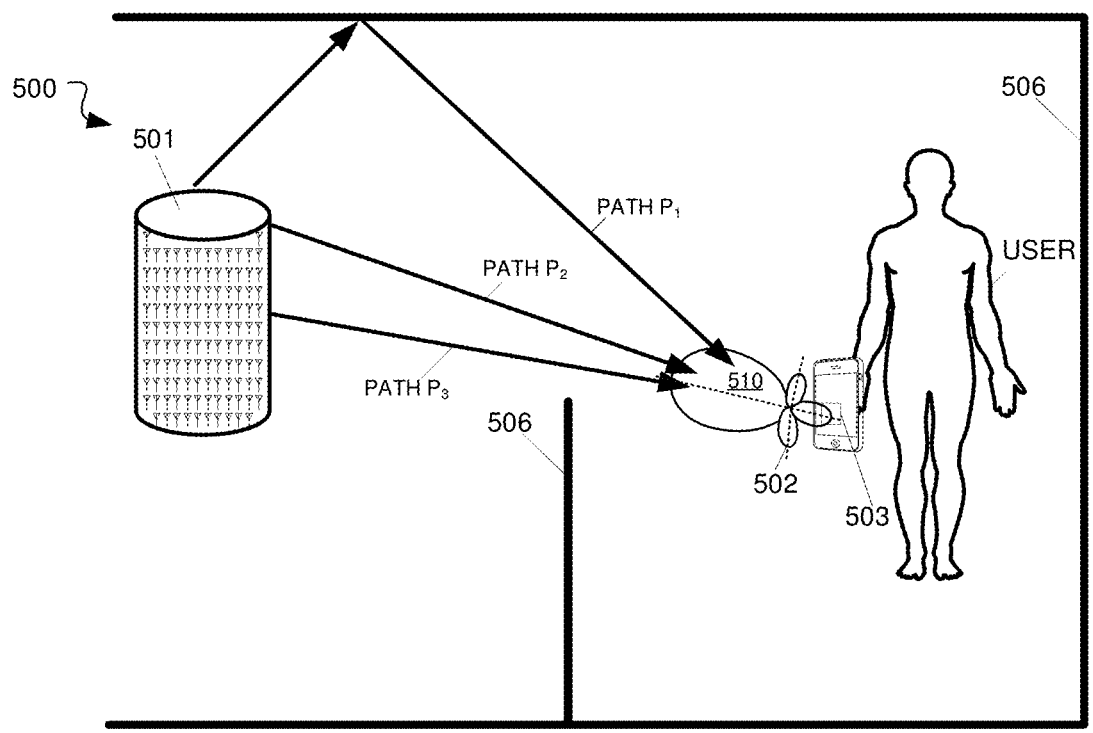

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., RSSI, depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments the beacon signals are directionally transmitted in this manner to, for example, avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetics. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

In retrodirective wireless power delivery environments, wireless power receivers generate and send beacon (or calibration) signals that are received by an array of antennas of a wireless power transmission system. The beacon signals provide the charger with timing information for wireless power transfers, and also indicate directionality of the incoming signal. As discussed herein, this directionality information is employed when transmitting in order to focus energy (e.g., power wave delivery) on individual wireless power receiver clients. Additionally, directionality facilitates other applications such as, for example, tracking device movement.

In some embodiments, wireless power receiver clients in a wireless power delivery environment are tracked by a wireless power transmission system using a three dimensional angle of incidence of an RF signal (at any polarity) paired with a distance determined by using an RF signal strength or any other method. As discussed herein, an array of antennas capable of measuring phase (e.g., the wireless power transmission system array) can be used to detect a wavefront angle of incidence. A distance to the wireless power receiver client can be determined based on the angle from multiple array segments. Alternatively, or additionally, the distance to the wireless power receiver client can be determined based on power calculations.

In some embodiments, the degree of accuracy in determining the angle of incidence of an RF signal depends on a size of the array of antennas, a number of antennas, a number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Figure 6:
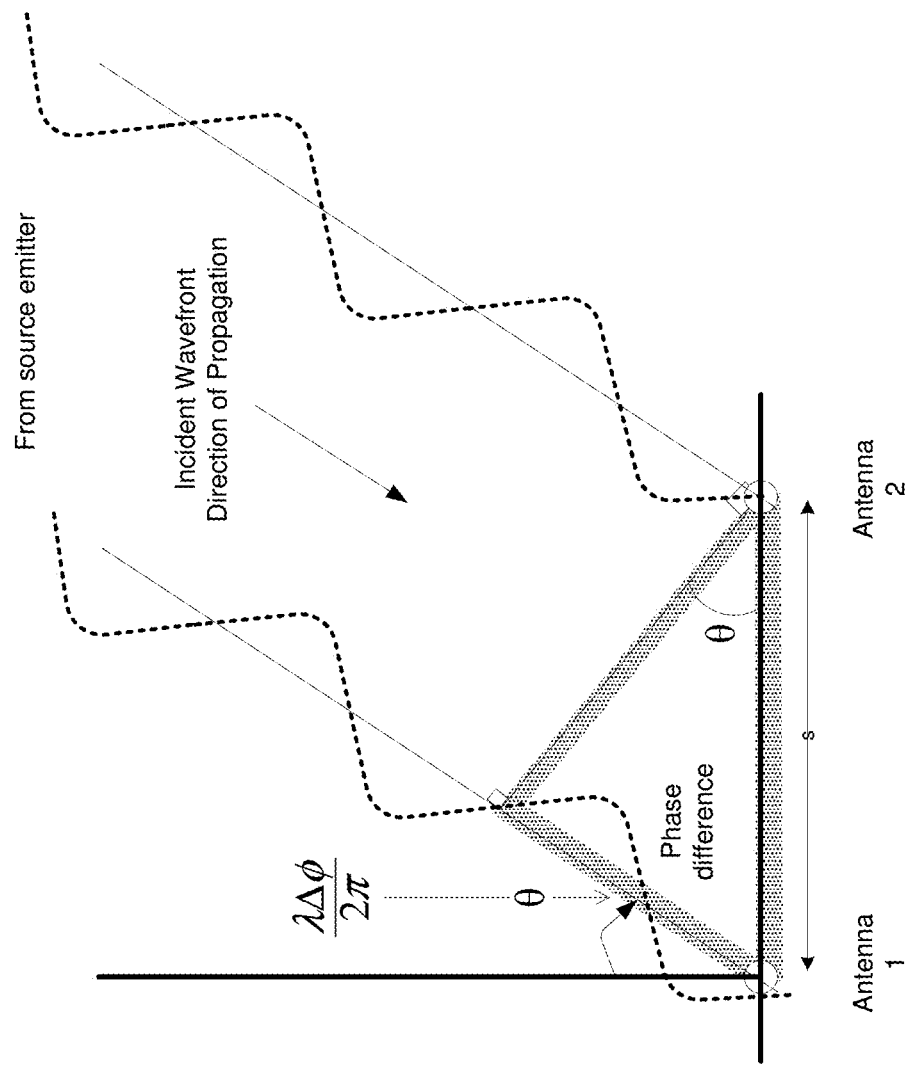
FIG. 6 is a diagram illustrating an example determination of an incident angle of a wavefront in accordance with some embodiments.

FIG. 6 is a diagram illustrating an example determination of an incident angle of a wavefront, according to some embodiments. By way of example and not limitation, the incident angle of a wavefront can be determined using an array of transducers based on, for example, the received phase measurements of four antennas for omnidirectional detection, or three antennas can be used for detecting the wavefront angle on one hemisphere. In these examples, the transmitting device (i.e., the wireless device) is assumed to be on a line coming from the center of the three or more antennas out to infinity. If the at least three different antennas are located a sufficient known distance away and are also used to determine incident wave angle, then the convergence of the two lines plotted from the phase-detecting antennas is the location of the device. In the example of FIG. 6, $$\theta = \sin^{-1}\left(\frac{\lambda \Delta \phi}{2\pi s}\right),$$

where $\lambda$ is the wavelength of the transmitted signal, and $\Delta \phi$ is the phase offset in radians and s is the inter-element spacing of the receiving antennas.

If less than one wavelength of antennas spacing is used between two antennas, an unambiguous two-dimensional (2D) wavefront angle can be determined for a hemisphere. If three antennas are used, an unambiguous three-dimensional (3D) angle can be determined for a hemisphere. In some embodiments, if a specified number of antennas, e.g., four antennas are used, an unambiguous 3D angle can be determined for a sphere. For example, in one implementation, 0.25 to 0.75 wavelength spacing between antennas can be used. However, other antenna spacing and parameters may be used. The antennas described above are omnidirectional antennas which each cover all polarities. In some embodiments, in order to provide omnidirectional coverage at every polarity, more antennas may be needed depending on the antenna type/shape/orientation.

Figure 7:
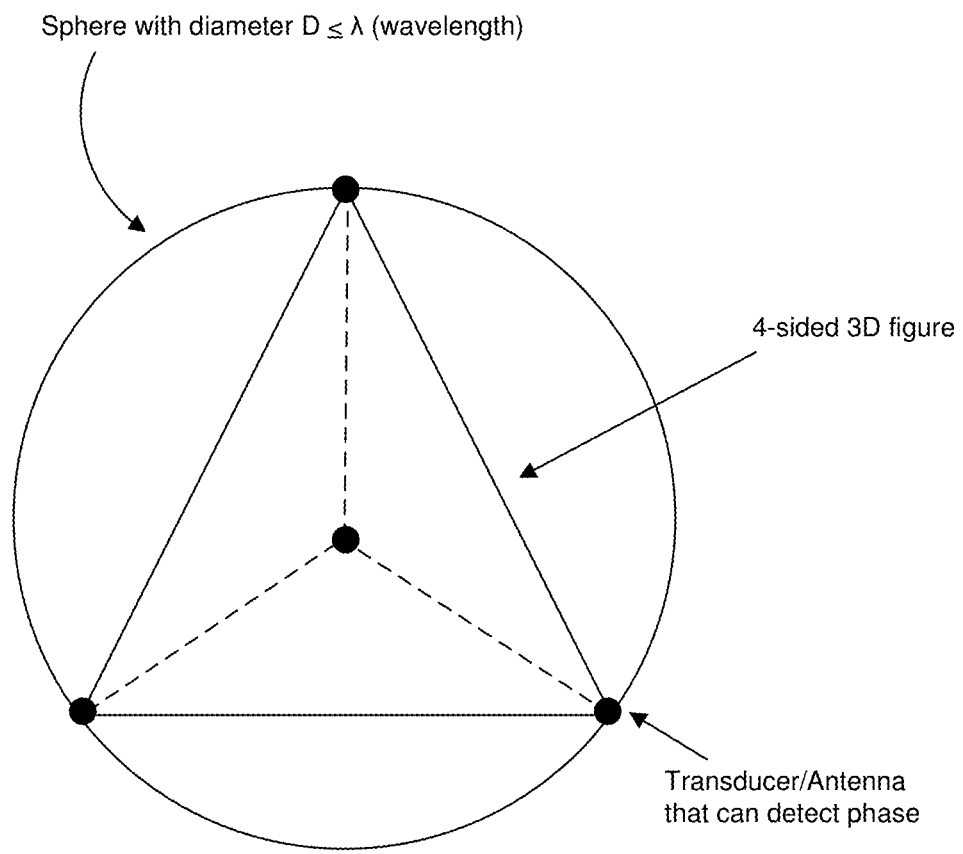
FIG. 7 is a diagram illustrating an example minimum omnidirectional wavefront angle detector in accordance with some embodiments.

FIG. 7 is a diagram illustrating an example minimum omnidirectional wavefront angle detector, according to some embodiments. As discussed above, the distance to the transmitter can be calculated based on received power compared to a known power (e.g., the power used to transmit), or utilizing other distance determination techniques. The distance to the transmitting device can be combined with an angle determined from the above-described process to determine device location. In addition, or alternatively, the distance to the transmitter can be measured by any other means, including measuring the difference in signal strength between sent and received signals, sonar, timing of signals, etc.

When determining angles of incidence, a number of calculations must be performed in order to determine receiver directionality. The receiver directionality (e.g., the direction from which the beacon signal is received) can comprise a phase of the signal as measured at each of multiple antennas of an array. In an array with multiple hundreds, or even thousands, or antenna elements, these calculations may become burdensome or take longer to compute than desirable. In order to reduce the burden of sampling a single beacon across multiple antenna elements and determining directionality of the wave, a method is proposed that leverages previously calculated values to simplify some receiver sampling events.

Additionally, in some cases it is extremely beneficial to determine if a receiver within the charging environment, or some other element of the environment, is moving or otherwise transitory. Thus, rather than the above attempt to determine actual or exact location, the utilization of pre-calculated values may be employed to identify object movement within the environment. Each antenna unit automatically and autonomously calculates the phase of the incoming beacon. The Antennas (or a representative subset of antennas) then report the detected (or measured phases up to the master controller for analysis). To detect movement, the master controller monitors the detected phases over time, looking for a variance to sample for each antenna.

II. Coexistence of WPTS in Shared Wireless Medium Environments

Wireless networks use the concept of a shared wireless medium, where in any radio frequency (RF) region, all of the wireless device share some or all of the same air space. Unlike conventional wired networks, such as Ethernet (IEEE 802.3), data transmission in wireless networks is inherently broadcast-based, being transmitted in the air as radio waves. This can lead to collisions if more than one device tries to communicate simultaneously. Wired technologies have techniques for collision detection and collision avoidance, such as CSMA/CD (Carrier Sense Multiple Access/Collision Detection) on Ethernet networks. On a wired network, if a collision is detected, packets can be resent. Conversely, in wireless networks there is no way for transmitting devices to detect a collision (with their transmissions) over the air.

Wireless networks use different approaches to address the shared-medium collision problem. For example, some wireless networks use a pre-defined time slot-based approach in combination with multiple channels. A well-known example of this is a network that employs TDMA (time-divisional multiple access), which is a channel access method for shared-medium networks. TDMA is used in digital 2G cellular networks, such as GSM (Global System for Mobile Communications). It is also used for the Digital Enhanced Cordless Telecommunication (DECT) standard for cordless phones. Both GSM and DECT combine TDMA with frequency hopping to minimize interference. Another scheme is code-division multiple access (CDMA), which employs a channel access mechanism. There are various flavors of CDMA used in mobile networks, such as IS-95, CDMA2000, wideband CDMA (W-CDMA), TD-CDMA, and TD-SCDMA. LTE (long-term evolution) cellular networks use Orthogonal Frequency Division Multiplexing (OFDM), which employs a frequency-division multiplexing (FDM) scheme used as a digital multi-carrier modulation method. OFDM is also used by some 802.11 standards, such as 802.11a, g, n and ac.

As described in further detail in the following section, WLANs use mechanisms including CSMA/CA (Carrier Sense Multiple Access/Collision Avoidance) for collision avoidance. Unlike wired Ethernet, WLANs operations are (generally) half duplex (noting this isn't strictly true for WLANs using MIMO (multiple input multiple output) radios. This means a wireless device (AP or endpoint, also referred to as a client or "station") can listen (receive) or talk (transmit), but cannot do both at the same time. In addition, in any given RF region that contains multiple wireless devices, only one device can (without interference) transmit at a time. This creates challenges in using RF as a shared medium. For instance, because only one device can be transmitting at a time, a single slow device has the potential to slow down all the wireless traffic in that RF region.

A common aspect of each of the foregoing wireless networks is that its shared medium/collision avoidance scheme is implemented using one or more standardized wireless protocols specific to the wireless technology used to implement the network. These standardize protocols are designed to support interoperation with wireless devices from different manufacturers. Moreover, many of the protocols support interoperation of devices having more advanced capabilities with legacy devices having reduced capabilities.

In accordance with aspects of embodiments provided herein, method, apparatus, and systems are disclosed for implementing wireless power transmission schemes over a shared wireless medium that is concurrently used for wireless data communications in a coexisting manner. For example, the embodiments facilitate wireless power transmission using the same RF channels or frequencies within or overlapping the channels implemented by existing standardized wireless networks, including WLANs and other wireless networks.

Figure 8A:
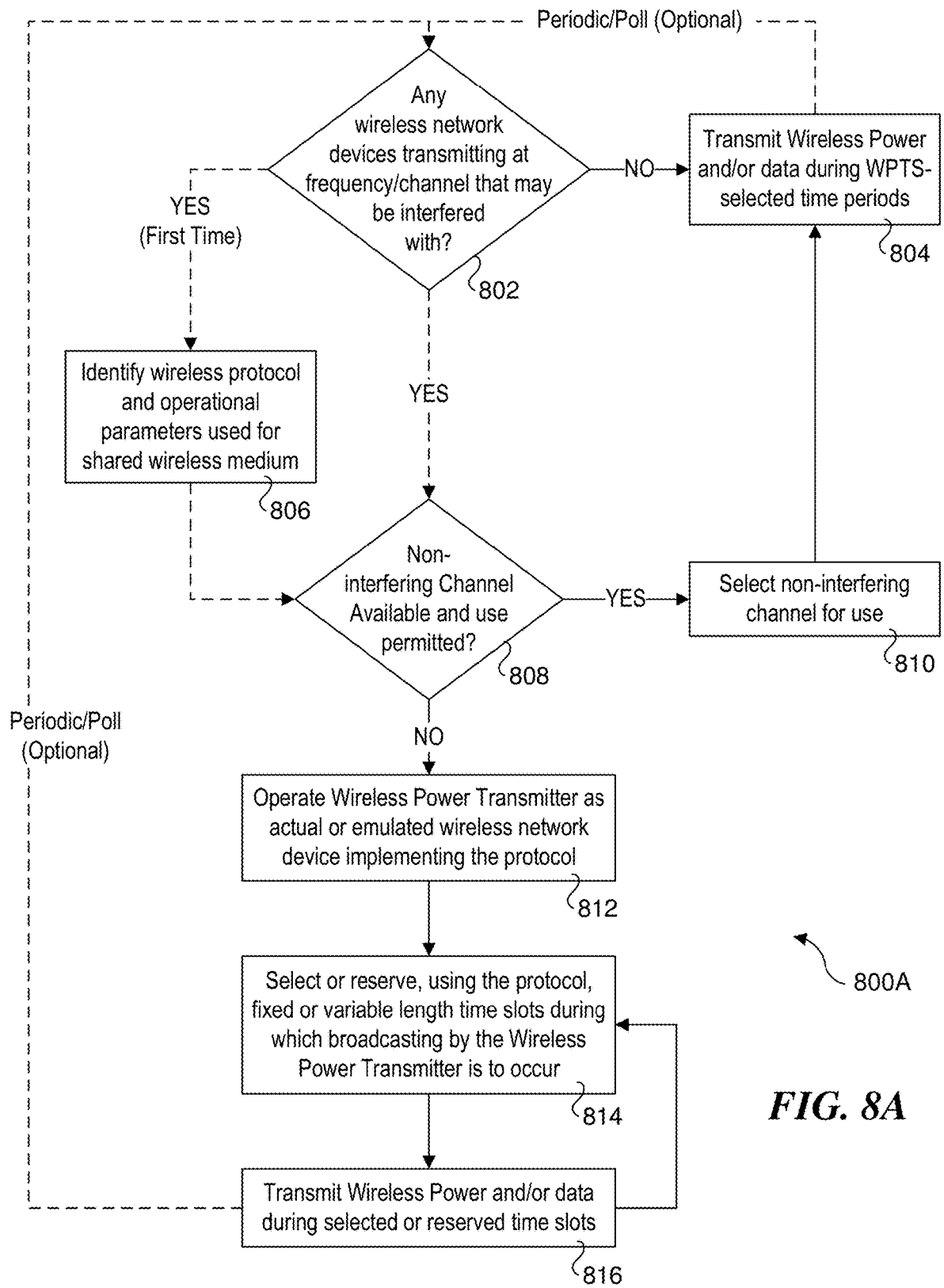
FIG. 8A shows a flowchart illustrating operations and logic for performing wireless power delivery in a manner that coexists with wireless equipment sharing the wireless medium, according to one embodiment.

A flowchart 800A illustrating operations and logic for implementing one embodiment of the approach suitable for various radio bands and associated standard wireless protocols is shown in FIG. 8A. As depicted by the loops and associated decision blocks and operation blocks, the operations and logic of flowchart 800A are implemented in an ongoing manner (noting some of the loops are optional).

In a decision block 802, a determination is made by the wireless power transmission system to whether any wireless network devices are transmitting at frequencies and/or channels that may be interfered with by wireless power signal transmissions originating from the WPTS. To support this determination, the WPTS is configured to detect utilization of one or more standardized wireless protocols over one or more radio band in which the WPTS operates or is capable of operating. For example, if the WPTS operates in the 2.4 GHz radio (or part of the frequencies used by the WPTS is in the 2.4 GHz radio band), the WPTS will be configured to detect standardize wireless protocols that use the 2.4 GHz radio band, such as various versions of IEEE 802.11 (Wi-Fi™) networks. At the same time, the WPTS may also detect operation of wireless transmissions using a standardized wireless protocol sharing the same RF region that are either unlikely to be interfered with by the WPTS operation or the amount of interference is negligible and/or meets transmission criteria defined by applicable standardize protocols. For example, while DECT equipment utilizes that same RF region as some Wi-Fi™ networks, due to the channel-hopping nature of DECT, as well as other considerations, the Wi-Fi™ networks are operated in a manner that is agnostic to the operations of the DECT equipment. This similarly may apply to Zigbee™ network, under appropriate conditions.

If the answer to decision block 802 is NO, the logic proceeds to a block 804 in which the WPTS transmits wireless power and/or data during WPTS-selected time periods. Essentially, this means the WPTS operates as if it is the only equipment utilizing the radio band or channel, and thus operates in the manner described above in accordance with FIGS. 1-7. As shown by the loop back to decision block 804, during operation in this mode the WPTS will periodically check (e.g., using polling or the like) to detect any changes in the shared wireless medium environment by re-evaluating the environment the determination made in decision block 802.

If the WPTS detects devices operating in a radio band or frequency that may be interfered with, the answer to decision block 802 is YES, and if this is the first time the other equipment is detected, the logic proceeds to a block 806 in which the protocol and associated operational parameters used for the shared wireless medium are identified. For example, for wireless protocols employing channels, one or more channels (that are in current use) may be identified. Other operational parameters may include transmission signal strength. In one embodiment, the WPTS clients (in addition to the WPTS transmitter) may also be used to detect transmission signal strength and/or operational parameters. For example, many 802.11 clients are enabled to determine an RSSI (Received Signal Strength Indicator) value, which is an indication to how well the device can "hear" a signal transmitted from an 802.11 AP. In shared medium environments where a WPTS and one or more 802.11 APs are not co-located, the interference that may occur at a client device may differ from what might be determined by measurements made at the WPTS transmitter. Accordingly, in this embodiment RSSI measurements by one of more client devices may be used as inputs to how the WPTS will be operated. Further details for using WPTS clients in connection with WPTS configuration are provided below with reference to FIG. 19.

Following the operation of block 806 and for situations where the logic has already flowed through block 806 a first time, the logic next proceeds to a decision block 808 to determine if there is a non-interfering channel available. For example, some standardized wireless protocols, such as IEEE 802.11, employ multiple channels under which operation at some channels are designed to not interfere with other channels (e.g., non-overlapping channels for 802.11 WLANs). If a non-interfering channel is available, the logic proceeds to a block 810 in which the non-interfering channel is selected for use by the WPTS. The logic then returns to block 804, wherein the WPTS operates using the non-interfering channel.

If there are no non-interfering channels available, the answer to decision block 808 is NO, and the logic proceeds to a block 812 in which the wireless power transmitter of the WPTS is operated as an actual or emulated peer wireless network device that implements the protocol identified in block 806 for transmission access purposes. In further detail, in one embodiment the WPTS transmitter does not fully implement all aspects of the protocol, but rather implements aspects of the protocol (via emulation of a peer wireless network device) to facilitate access to the channel for transmitting power signals and/or communicating with the WPTS in a manner that coexists with the operation of other equipment utilizing the shared wireless medium. In other embodiments, the WPTS transmitter may function as an actual wireless network device, such as a WLAN access point or station.

Under one embodiment, the WPTS operates as a WLAN access point, such as an 802.11 AP, as described in detail below. Optionally, the WPTS may operate as a wireless client device, such as an 802.11 station under the protocol. As yet another option, the WPTS may operate as multiple client devices under the protocol, or as a combination of an (actual or emulated) access point and one or more client devices operating over multiple channels in parallel.

Next, in a block 814, fixed or variable-length time slots are during which broadcasting by the WPTS is to occur are selected or reserved. Generally, such time slots may be dynamically selected or reserved using random access mechanism, or reserved using a standing reservation implemented by a protocol such as slotted Aloha protocol. Wireless power signals and/or data is then transmitted by the WPTS to one or more WPTS clients in a block 816 during the time slots. The operations of blocks 814 and 816 are then repeated in an ongoing manner, as shown by the loop back from block 816 to block 814.

As shown by the loop from block 816 to 802, the WPTS periodically re-evaluates the shared wireless medium environment to detect changes in the utilization of the radio band(s) it is using for operations. For example, another wireless AP located within the signal range of the WPTS (e.g., as defined by a predetermined RSSI threshold) may begin operating, resulting in a change to the shared wireless medium environment. In addition to wireless APs with fixed location, many mobile phones support wireless "hot spots," under which they operate as a local 802.11 AP with (generally) reduced range (relative to fixed APs). In some embodiments, utilization of mobile wireless hot spots within the service area of a WPTS are detected, and applicable configuration changes are implemented.

Wi-Fi™ CSMA/CA for WPTS Interoperation

In some embodiments, the operations of block 814 will be implemented in accordance with the applicable wireless protocol that is being employed for wireless network device operation, and, as such, the determination of the time slots will be a function of both the protocol and the behavior of other devices employing the protocol. In some embodiments, one or more IEEE 802.11x protocols are used, wherein 'x' can be any of 'a', 'b', 'g', 'n', 'ac', or any other existing or future 802.11 protocol defined for use by the Wi-Fi Alliance™, also collectively referred to as Wi-Fi™ networks or WLANs.

Clear and Non-Interfering Channel Operations

There are multiple schemes that may be used to support coexisting operation of a WPTS in a Wi-Fi™ shared medium environment. As discussed above with reference to decision block 802 of flowchart 800A or FIG. 8A, a first determination is made to determine if there are any wireless networks operating in the shared medium environment that may be interfered with. In some embodiments, this determination is made using a Clear Channel Assessment (CCA) energy detection (ED) measurement.

The original 802.11 requirement for receive sensitivity was to be able to receive 2 Mbps (using DQPSK) at an RSSI of −80 dBm with a given error rate. In 802.11a and beyond, the ED threshold was set to 20 dB above the minimum receive sensitivity defined in the applicable standard.

In the original 802.11 (DSSS) standard the ED threshold was defined as:
- −80 dBm for stations using a transmit power of 100 mW or more.
- −76 dBm for stations using a transmit power of more than 50 mW
- −70 dBm for stations using a transmit power of less than or equal to 50 mW In later amendments the threshold was changed to: 802.11b (HR-DSSS): −76 dBm, −73 dBm and −70 dBm respectively following the same pattern as defined for DSSS above; and 802.11a/g/n/ac: −62 dBm (using a 20 MHz Channel).

Vendors will typically implement an ED threshold of just less than −62 dBm to be compliant across 802.11 standards. Using an ED threshold of −65 dBm is common. Thus, if the detected energy in the radio band(s) intended to be used by the WPTS is <−65 dBm, all channels (that may be used by the WPTS) are considered clear. ED may also be used for CCA within a specific channel, in which case the ED measurement is used to detect whether the channel is idle or in use. Generally, the energy detection measurement is not limited to Wi-Fi™ sources, and may include energy detection of non-Wi-Fi™ sources within the radio band(s).

A related aspect of this first scheme is to find a non-interfering channel that may be used by the WPTS in Wi-Fi™ environments. If a non-interfering channel is available (that is, a channel for which WPTS operation will meet the channel attenuation requirements per the applicable 802.11 specification), then that non-interfering channel may be used.

802.11b, 802.11g, and 802.11n-2.4 utilize the 2.400-2.500 GHz spectrum, while 802.11a, 802.11n, and 802.11ac use the 4.915-5.825 GHz band. These are commonly referred to as the "2.4 GHz" and "5 GHz" bands, respectively. Each RF spectrum is sub-divided into channels with a center frequency and bandwidth, wherein the channels and bandwidth differ somewhat between different versions of 802.11.

As an example, FIG. 9A illustrates the channel spacing of an 802.11b and 802.11g WLAN operating at (nominally) 2.4 GHz. As shown, the first 13 channels begin at 2.412 GHz and have a channel separation of 5 MHz. The channel separation between channels 13 and 14 is 12 MHz. As also depicted, the channels have a 22 MHz width at −95 dBm, which includes a 20 MHz signal bandwidth plus a 2 MHz gap that is used as a guard band. As further depicted in FIG. 9A and FIG. 9B, there is guaranteed channel separation for channels 1, 6, 11, and 14 (noting the channel separation between channels 11 and 14 is less than between 1, 6, and 11).

The non-overlapping channels in the United States for 2.4 GHz WLANs are shown FIG. 10A, while the non-overlapping channels for 2.4 GHz WLAN for most other countries are shown in FIG. 10B. Under IEEE 802.11n, two 20 MHz channels can be bounded to form a 40 MHz channel. When using the 40 MHz channels, non-overlapping channels are channel 3 for the US and channels 3 and 11 elsewhere (generally).

There is generally more variance in channel spacing for the 5 GHz WLAN operations, and the channels are not sequentially ordered, as shown in TABLE 1. In this table DFS=Dynamic Frequency Selection; TPC=Transmit Power Control; SRD=Short Range Devices 25 mW max power.

TABLE 1

| CHANNEL NUMBER | FREQUENCY MHZ | EUROPE (ETSI) | NORTH AMERICA (FCC) | JAPAN |
|---|---|---|---|---|
| 36 | 5180 | Indoors | ✓ | ✓ |
| 40 | 5200 | Indoors | ✓ | ✓ |
| 44 | 5220 | Indoors | ✓ | ✓ |
| 48 | 5240 | Indoors | ✓ | ✓ |
| 52 | 5260 | Indoors/DFS/TPC | DFS | DFS/TPC |
| 56 | 5280 | Indoors/DFS/TPC | DFS | DFS/TPC |
| 60 | 5300 | Indoors/DFS/TPC | DFS | DFS/TPC |
| 64 | 5320 | Indoors/DFS/TPC | DFS | DFS/TPC |
| 100 | 5500 | DFS/TPC | DFS | DFS/TPC |
| 104 | 5520 | DFS/TPC | DFS | DFS/TPC |
| 108 | 5540 | DFS/TPC | DFS | DFS/TPC |
| 112 | 5560 | DFS/TPC | DFS | DFS/TPC |
| 116 | 5580 | DFS/TPC | DFS | DFS/TPC |
| 120 | 5600 | DFS/TPC | No Access | DFS/TPC |
| 124 | 5620 | DFS/TPC | No Access | DFS/TPC |
| 128 | 5640 | DFS/TPC | No Access | DFS/TPC |
| 132 | 5660 | DFS/TPC | DFS | DFS/TPC |
| 136 | 5680 | DFS/TPC | DFS | DFS/TPC |
| 140 | 5700 | DFS/TPC | DFS | DFS/TPC |
| 149 | 5745 | SRD | ✓ | No Access |
| 153 | 5765 | SRD | ✓ | No Access |
| 157 | 5785 | SRD | ✓ | No Access |
| 161 | 5805 | SRD | ✓ | No Access |
| 165 | 5825 | SRD | ✓ | No Access |

Figure 10C:
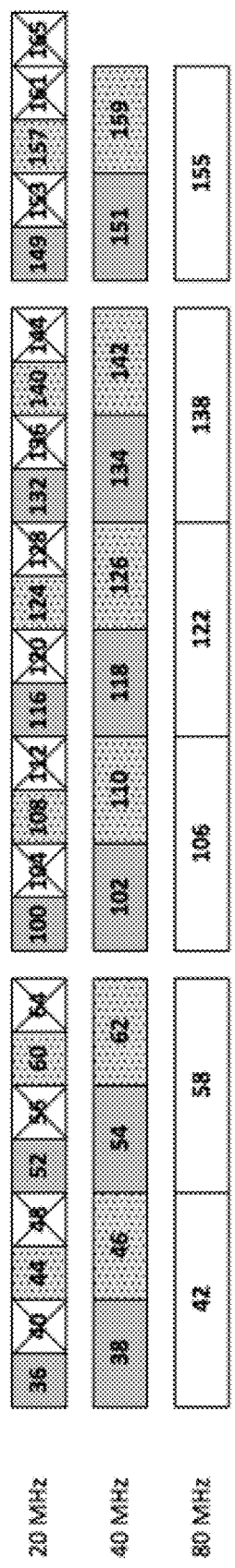
FIG. 10C is a diagram showing non-overlapping channels for IEEE 802.11ac WLANs.

With respect to channel overlap for 5 GHz operations, different channels may have different channel widths. For example, 802.11ac may use channels having widths of 20 MHz (channels 36, 40, 44, 48, 52, 56, 60, 64, 100, 104, 108, 112, 116, 120, 124, 128, 132, 136, 140, 144, 149, 153, 161, 165, 169) 40 MHz (channels 38, 46, 54, 62, 102, 110, 118, 126, 134, 142, 151, 159), 80 MHz (channels 42, 58, 106, 122, 138, 155), and 160 MHz (channels 50, 114). FIG. 10C shows the non-overlapping 40 MHz and 80 MHz 802.11ac channels.

In addition to specifying the channel center frequency, 802.11 also specifies (in Clause 17) a spectral mask defining the permitted power distribution across each channel, as shown in FIG. 9B for 802.11g. The mask requires the signal be attenuated a minimum of 20 dB from its peak amplitude at ±11 MHz from the center frequency, the point at which a channel is effectively 22 MHz wide. The result of this is that additional channels that are (nominally) overlapping may be used while meeting the attenuation requirements if the signal strength of the other channels is low enough. For instance, it may be possible to use channels 1 and 3 or 1 and 4 and meet the minimum attenuation requirements if the devices using channels 1 and 3 or 4 are spaced far enough apart. In accordance with decision block 808 and block 810 of flowchart 800A, detection and selection of a non-interfering channel may involve signal strength measurements at one or more locations in the shared wireless medium environment.

Wi-Fi™ CSMA/CA for WPTS Coexistence

Under some environments, a non-interfering channel may not be available. Alternatively, in other environments utilization of non-interfering channels may not be an option, as it might violate an IT policy or for other reasons. To address these situations, in some embodiments an 802.11 CSMA/CA scheme may be used. The 802.11 CSMA/CA schemes include CCA—Carrier Sense (CS)—PLCP Preamble, and CCA—MAC—Duration/ID and the Network Allocation Vector (NAV). Under CCA—Carrier Sense (CS)—PLCP Preamble, a PLCP (Physical Layer Convergence Procedure) header is used to transmit how much time is needed to transmit the data. This may be sent as a coding method and bytes or simply in microseconds (μS), but is generally sent at the lowest default mode. 6 Mbps at a signal level of −82 dBm is the minimum required receive sensitivity to meet the minimum required 802.11 standards. However, enterprise WLAN equipment have receiver sensitivities that are vastly better than this required value. For example, some WLAN equipment go lower than −95 dBm.

Aspects of CCA—MAC—Duration/ID and the Network Allocation Vector are illustrated in various Figures herein and described in detail below. Under this approach, a Duration or Duration ID indicates future traffic to allow for interframe spaces, ACKs, etc., and allows for complete frame transmission without interruption. The MAC header may also be sent at higher rate and/or at a different rate than the data that follows.

As discussed above, Wi-Fi™ stations cannot detect collisions over the air. To address this, IEEE 802.11 protocol define a "randomized access" medium contention approach. Technically, this is called p-persistent CSMA, where "p" indicates the probability of transmission when the medium is found to be idle after it was previously busy (perhaps due to a previous frame transmission). Randomized network access is beneficial when multiple stations have queued traffic awaiting transmission, yet the medium is busy. The previous frame transmission and access deferral serve to align subsequent transmission attempts by multiple stations, and without randomized access, there is a much higher probability of frame collisions. Coupled with the inability to detect collisions over the air, multiple stations would continue transmitting at the same time for the full length of the frame, wasting large amounts of airtime and causing significant network overhead.

Figure 11:
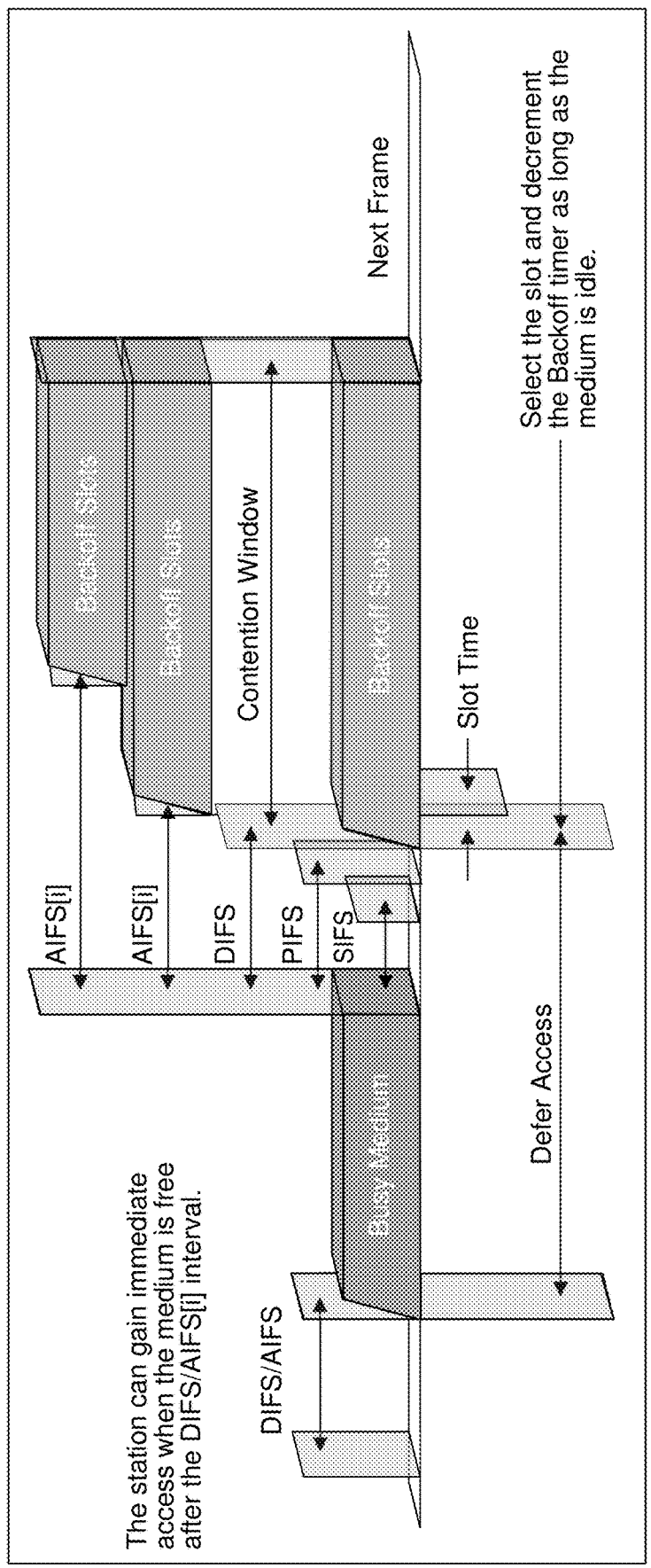
FIG. 11 is a diagram illustrating an IEEE 802.11 WLAN collision avoidance mechanism.

Wi-Fi™ collision avoidance mechanisms include interframe spacing for different high-level frame types (for instance, control versus data frames) and a contention window to introduce randomness into the distributed medium contention logic of radio transmitters since there is no central source of coordination between Wi-Fi™ stations. Aspects of this scheme are depicted in FIG. 11.

In a manner similar to Ethernet, Wi-Fi™ WLANs transfer data via packets encapsulated in frames. Inter-frame spacing provides priority access for a select few types of control frames necessary for proper network operation. The Short InterFrame Spacing (SIFS) value is used for acknowledgements that must directly follow the previous data frame; Distributed Coordination Function (DCF) InterFrame Spacing (DIFS) is used for non-QoS (Quality of Service) data frames; Arbitrated InterFrame Spacing (AIFS) is used for QoS data frames and is variable based on the Wi-Fi™ Multimedia (WMM) Access Category (AC) to which the frame is assigned.

Before frame transmission, Wi-Fi™ stations select a random timer value within the contention window range and countdown until the timer expires (unless the medium was idle immediately prior, in which case the contention window timer may be skipped). Only then are stations allowed to transmit the frame if the medium is still idle. If a collision occurs (as implied by the absence of an acknowledgement frame), then the transmitting stations double the contention window size to reduce the probability of a subsequent collision, up to a fixed maximum contention window size. This is called Truncated Binary Exponential Backoff. The initial small contention window size is referred to as the Contention Window Minimum (CWMin) and the capped maximum size is referred to as Contention Window Maximum (CWMax). When WMM QoS is in use, both interframe spacing and the contention window size vary based on the WMM AC to which the frame belongs, providing a statistical advantage for higher priority traffic over lower priority traffic. This method of probability-based medium contention introduces a large amount of network overhead to minimize the possibility of a frame collision.

Since Wi-Fi™ stations cannot directly detect collisions over the air and because the medium is not reliable, which can result in frame loss or corruption due to various sources of signal attenuation or RF interference, various version of the 802.11 protocol specify use of positive frame acknowledgments. Under this scheme, the receiving station sends back a short acknowledgment frame to the transmitting station, indicating successful reception of the immediately preceding data frame. However, since there is an acknowledgement for each transmission, positive frame acknowledgement is a large source of network overhead on Wi-Fi™ networks. 802.11n and 802.11ac stations can minimize both medium contention and acknowledgement overhead by using frame aggregation and block acknowledgements, which allow the transmitting station to send multiple data frames at once and receive one acknowledgement from the receiver. By eliminating the need to acknowledge each individual frame, more network capacity is available for data transmission, resulting in better system performance. This is due, in part, to the half-duplex nature of 802.11, which relies on the same channel (frequency) for bi-directional communication. The block acknowledgement indicates which frames were received successfully and which were not, allowing selective retransmission of only the frames that were not properly received (similar to TCP selective acknowledgements at Layer 4 in the OSI model).

Operation Supporting Legacy WLAN Stations 802.11 specifies protection mechanisms that provide backwards compatibility to ensure the coexistence of older WLAN stations with newer ones as well as to ensure all Wi-Fi™ stations on the channel are made aware of a pending frame transmission and defer access to prevent frame collisions, reducing hidden node problems. Such backwards compatibility is necessary because stations that only implement earlier 802.11 protocols (e.g., 802.11a and 802.11b) cannot interpret transmission at higher data rates by stations implementing more recent 802.11 protocols (e.g., 802.11g, n, or ac) due to different modulation and encoding techniques. Therefore, newer stations need to transmit RTS/CTS (Request to Send/Clear to Send) or CTS-to-Self control frames at the legacy data rate before transmitting their higher-speed data frames. RTS/CTS ensures that all stations receive the frame and appropriately set their NAV (which is a type of internal back-off timer) to defer transmission for the length of time indicated for completion of the subsequent higher-speed data frame transmission. The use of the NAV supports Virtual Carrier Sense under which the other stations are enabled to determine how much time the channel will be busy following the RTS/CTS exchange.

Most modern 802.11 stations automatically implement CTS-to-Self mechanisms for protection when the AP indicates that older stations are associated or detected within range. Generally, RTS/CTS must be manually enabled, but is more thorough in protecting a frame transmission from collision because it prevents hidden node issues and allows all stations within the AP range to hear the CTS frame when it is transmitted by the AP. As illustrated in flowchart 800B of FIG. 8B and described below, RTS/CTS will be used by a WPTS to provide legacy support, if needed, or, alternatively, may be selectively activated.

Figure 12:
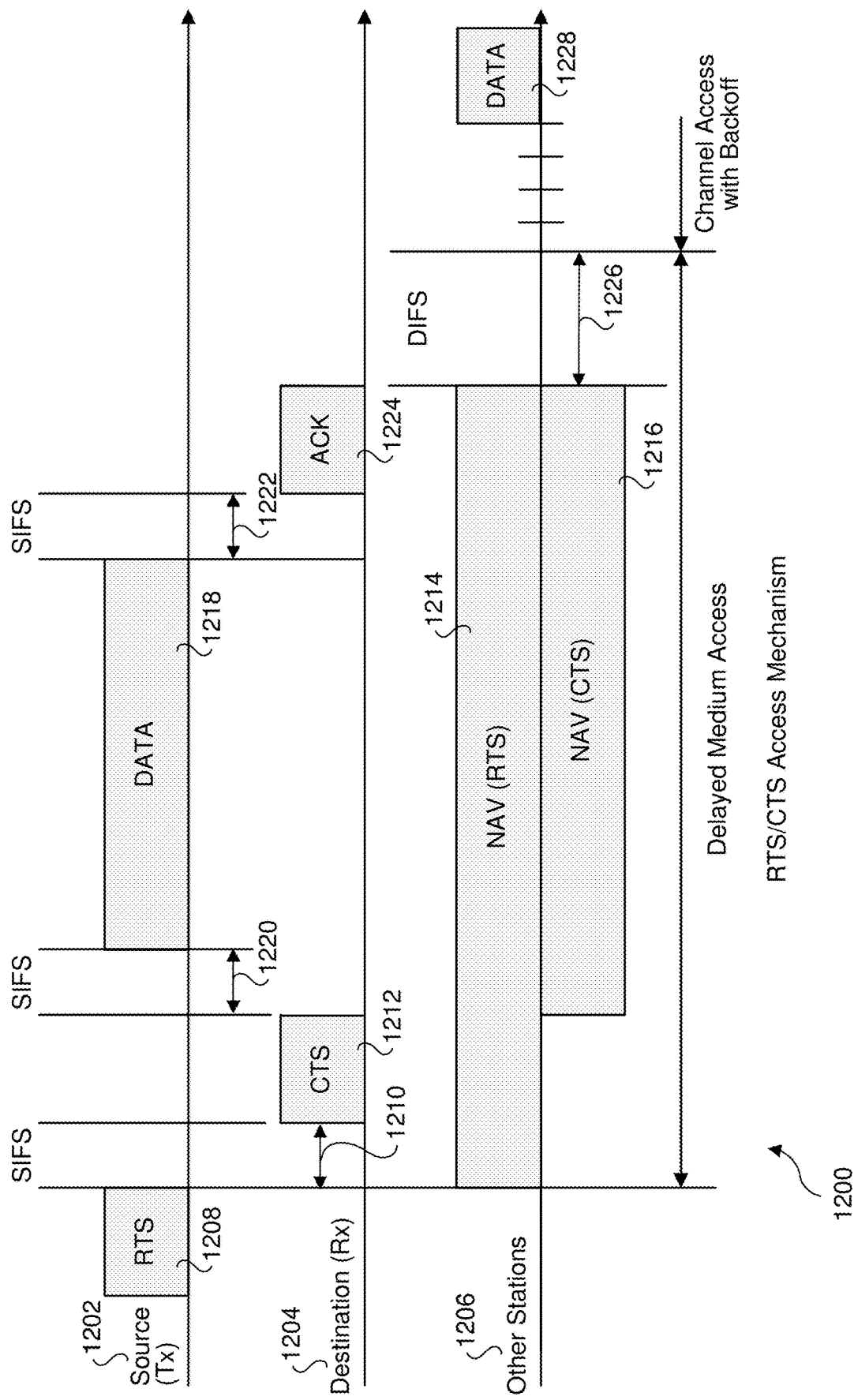
FIG. 12 is a diagram illustrating the IEEE 802.11 Request to Send/Clear to Send channel reservation and access algorithm.

The foregoing operations are schematically illustrated in diagram 1200 of FIG. 12. Diagram 1200 depicts operations performed by a source (transmitter) 1202, a destination (receiver) 1204, and other stations 1206. The sequence starts with source 1202 detecting an idle channel, followed by transmitting a request to send (RTS) frame 1208. The RTS frame contains five fields, including a frame control, duration, receiver address (RA), transmitter address (TA), and frame check sequence (FCS). The TA identifies source 1202 as the station transmitting the RTS and the RA identifies destination 1204 as the station to which the data (to be sent) following the RTS/CTS sequence is destined. After the RTS message has been transmitted, a first SIFS period 1210 occurs, followed by destination 1204 returning a clear to send (CTS) frame 1212 to source 1202. The CTS frame includes a frame control, duration, RA, and FCS.

Meanwhile, operations are performed by the other stations in parallel. As discussed above, the RTS frame 1208 includes a duration, which corresponds to a timeframe during which the shared medium will be in use. Accordingly, a NAV (RTS) 1214 is generated for each of the other stations 1206. Similarly, a NAV (CTS) 1216 is generated upon completion of the CTS frame 1212.

Returning to the operations of source 1202 and destination 1204, source 1202 transmits a DATA frame 1218 following a second SIFS period 1220. Details of various 802.11 data frame formats are discussed below. DATA frame 1218 includes various fields (discussed below in further detail) including a data (payload) field containing the data being transmitted to destination 1204. Following transmission of DATA frame 1218 is a third SIFS period, followed by an acknowledgment (ACK) frame 1224 returned by destination 1204 to source 1202.

As illustrated, the end of NAV (RTS) 1214, NAV (CTS) 1216, and ACK frame 1224 are configured to coincide in time. In practice, each of the other stations implements a countdown timer that is set to an initial count value corresponding to the durations fields of RTS frame 1208 and CTS frame 1212, respectively. At the expiration of the countdown time, each of the other stations 1206 listen for an idle medium during a DIFS period 1226. Subsequently, a random channel access with backoff is implemented followed by transmission of a DATA frame 1228.

Distribute Coordination Function

Figures 13, 14:
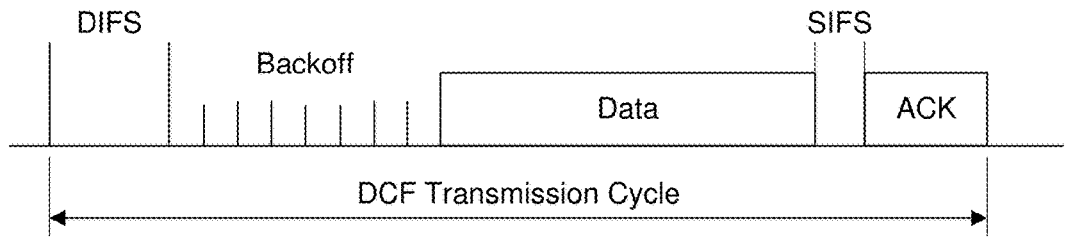
FIG. 13 is a diagram illustrating the Distributed Coordination Function (DCF) implemented in IEEE 802.11 WLANs.
FIG. 14 is a table illustrating various parameters relating to implementing the Distributed Coordination Function using different 802.11 PHYs.

An illustration of the Distributed Coordination Function (DCF) used by 802.11 WLANs is shown in FIG. 13. The transmission cycle of DCF ($T_{DCF}$) consists of DIFS time ($T_{DIFS}$), backoff time ($T_B$), data transmission time ($T_{DATA}$), SIFS time ($T_{SIFS}$) and ACK transmission time ($T_{ACK}$):

$$T_{DCF} = T_{DIFS} + T_B + T_{DATA} + T_{SIFS} + T_{ACK} \qquad (1)$$

The backoff time TB is a function of a random*time slot with binary exponential backoff:

$$\frac{1}{N+1} \sum_{i=0}^{N} i \qquad (2)$$

Examples of various values for SIFS, Slot Time, PIFS, and DIFS for different 802.11b, 802.11g, 802.11a, and 802.11n PHY (Physical) layers are shown in FIG. 12. Under 802.11 embodiments disclosed herein, the backoff time that is to be implemented will be a function of the applicable 802.11 PHY that is detected (e.g., detected in block 806 of flowchart 800).

Figure 15:
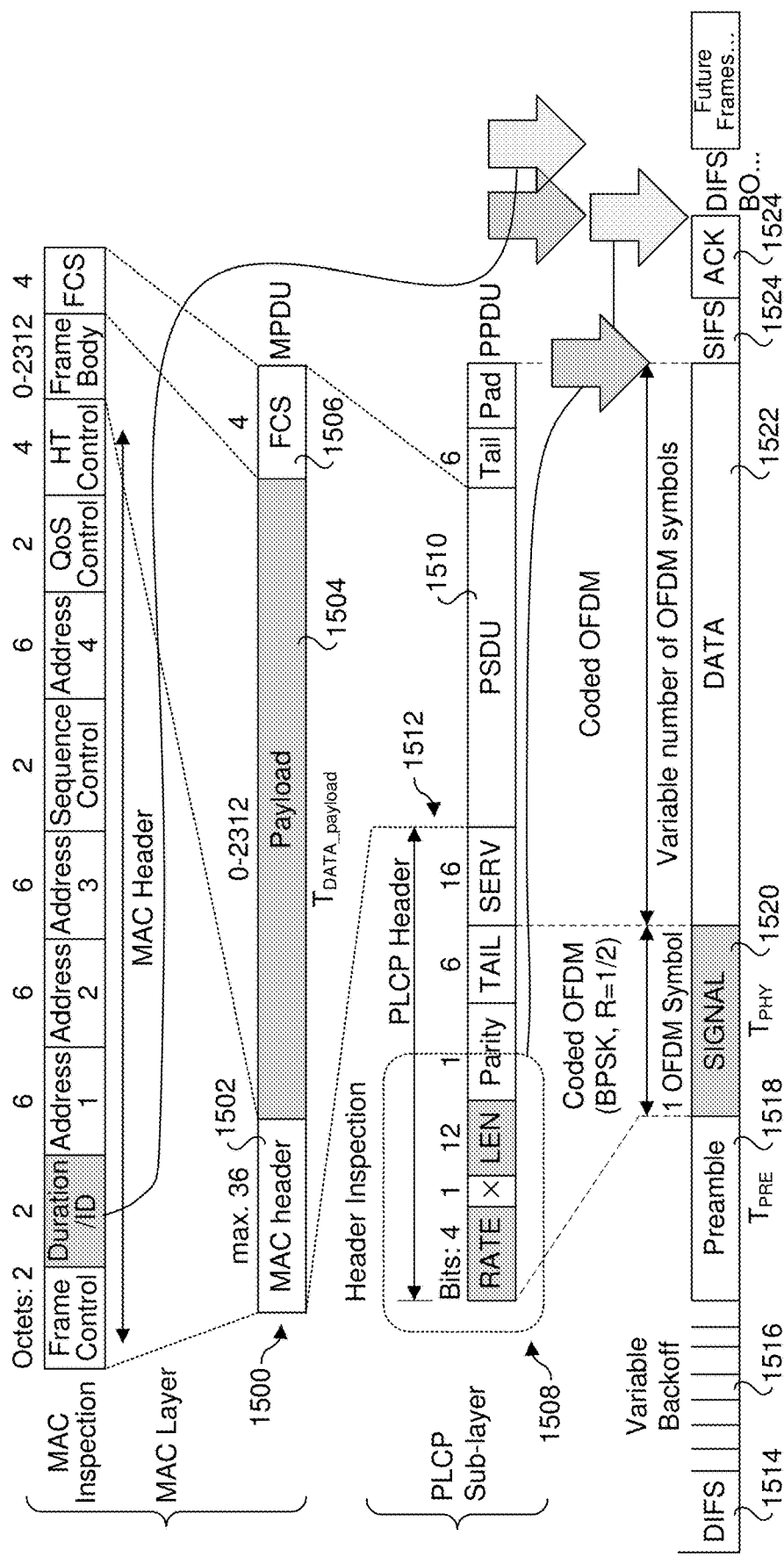
FIG. 15 is a diagram illustrating frame formatting implemented for IEEE 802.11n at the MAC layer and the PLCP sub-layer, along with how the PLCP Protocol Data Units (PPDU) are transmitted using the IEEE 802.11 DCF.

The upper portion of FIG. 15 depicts an IEEE 802.11n MAC frame format, which includes a MAC Protocol Data Unit (MPDU) 1500 at the MAC layer. MPDU 1500 includes a MAC header 1502, a payload 1504 having a size of 0-2312 Bytes, and a 4-Byte Frame Control Sequence (FCS) 1506. MAC header 1502 comprises a 2-octet frame control field, a 2-octet Duration/connection ID field, three 6-octet (48-bit) addresses fields, a 2-octet sequence control field, a fourth 6-octet address field, a 2-octet QoS control field, a 2-octet HT control field.

The 802.11 PHY is divided into two sublayers
1. PLCP (Physical Layer Convergence Procedure) sublayer
2. PMD (Physical Medium Dependent) sublayer The PLCP sublayer prepares the frame for transmission by taking the frame from the MAC layer and creating a PLCP Protocol Data Unit (PPDU) 1508. The PMD sublayer (not shown) then modulates and transmits the data as bits. When the MPDU 1500 is handed down to the physical layer it is referred to as PLCP Service Data Unit (PSDU) 1510. When PLCP receives the PSDU, it prepares the PSDU to be transmitted and creates the PPDU. The PLCP sublayer also adds a preamble and PHY header to the PSDU (collectively depicted as PLCP header 1512). The PLCP header includes a 4-bit RATE field defining a transmission rate to be used, a 1-bit reserved field, a 12-bit length (LEN) field defining a length in bytes of the transmission (to follow), a 1-bit parity field, a 6-bit tail, and a 16-bit service (SERV) field. Based on the rate and the length information, 802.11a/g/n/ac receiving stations can determine how long the channel will be busy.

For stations using legacy DSSS (802.11) and HR-DSSS (802.11b) radios, the PLCP Header is preceded by a Start of Frame Delimiter of 16 bits (not shown in FIG. 15). The DSSS/HR-DSSS PLCP Header contains a Length Field defining the period of time in microseconds that the channel will be busy for (as opposed to the length in bytes uses by 802.11a/g/n/ac stations).

The lower portion of FIG. 15 shows how a PPDU is sent using the Distributed Coordination Function. As illustrated, the transmission sequence begins with a DIFS period 1514, followed by a variable backoff (BO) 1516. A transmit preamble 1518 is then broadcast, followed by a signal 1520 composed of one OFDM symbol. Signal 1520 includes all of the fields in the PLCP header 1512 except for the service field. Data 1522 is then transmitted, which will use a variable number of OFDM symbols, with the number of symbols being a function of the amount of payload data 1504. As further shown, data 1522 is composed of the 16-bit service field, PSDU 1510, the 6-bit tail, and any padding. After data 1522 is transmitted, the medium is idle for a SIFS period 1524, followed by an ACK frame 1524. This sequence is then repeated in an ongoing manner.

Figure 15A:
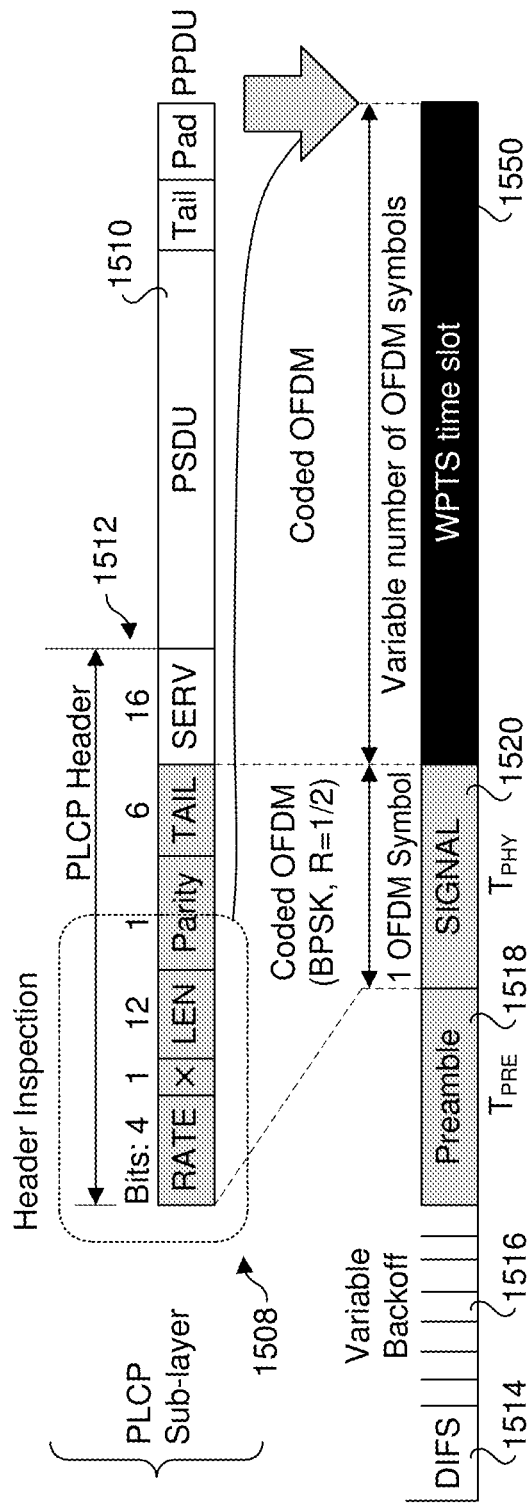
FIG. 15A is a diagram illustrating a modified implementation of the diagram of FIG. 15A under which time slots selected using the IEEE 802.11 PCLP protocol are implemented as WPTS time slots.

In some embodiments the WPTS transmitter operates as an emulated 802.11 access point and the WPTS transmitter and clients access the shared wireless media during time slots that are identified (selected or reserved) using the applicable 802.11 protocol version. For example, as shown in FIG. 15A, the WPTS transmitter is operating under the 802.11n protocol to obtain access to the channel. In other embodiments, the WPTS transmitter operates as an actual 802.11 access point that is augmented to support the additional functionality disclosed herein. For example, a WPTS transmitter may operate as a Wi-Fi™ access point for communicating with WPTS client systems in the manner discussed above, with reference to communication block 330 of FIG. 3A, discussed below.

As illustrated, the timing diagrams and layers are similar in FIGS. 15 and 15A, including the PLCP sub-layer and the use of the Distributed Coordination Function. The portions of the timing diagram shown in gray in FIG. 15A indicate the WPTS is operating under the 802.11n protocol in the conventional manner. However during the period data 1522 would be transmitted under the 802.11n protocol shown in FIG. 15, the WPTS has access to the shared wireless medium, as depicted by a WPTS time slot 1550 in FIG. 15A.

During a WPTS time slot, the WPTS has access to the channel (or utilizing frequencies within or overlapping the channel) and can utilize the time slot for WPTS purposes. During a given WPTS time slot, the WPTS may transmit power signals to the WPTS clients using the WPTS transmission scheme discussed above. In addition, the WPTS may also send data to the WPTS clients and/or receive data from the WPTS clients during a WPTS time slot. For example, a given WPTS time slot may entail a pair of communications between a WPTS transmitter and a WPTS client (e.g., used for WPTS operations), followed by transmission of power transmission signals during the remainder of the WPTS time slot, or the order may be reversed, where the power transmission signals are transmitted during the first portion of the WPTS time slot.

The foregoing operations are different than conventional 802.11 operation in several respects. First, under conventional 802.11 operations, a WPTS client (operating as a WLAN station) could only transmit during a time slot selected or reserved by the WPTS client using the applicable 802.11 protocol. Second, during a WPTS time slot, the WPTS transmitter may transmit power signals during the time slot without following the PLCP sublayer format of a 16-bit service field, followed by PSDU 1510, and then followed by a tail and a pad (i.e., any padding). Rather, the entire time slot may be used by the WPTS for WPTS purposes.

As another augmentation to conventional 802.11 operation, when a positive acknowledgment scheme is being implemented for 802.11 communications, there is no need to acknowledge the WPTS power signals. As a result, the WPTS time slot can be extended to use any following (the transmission of data) time allocated for the channel for positive ACKs.

Figure 16:
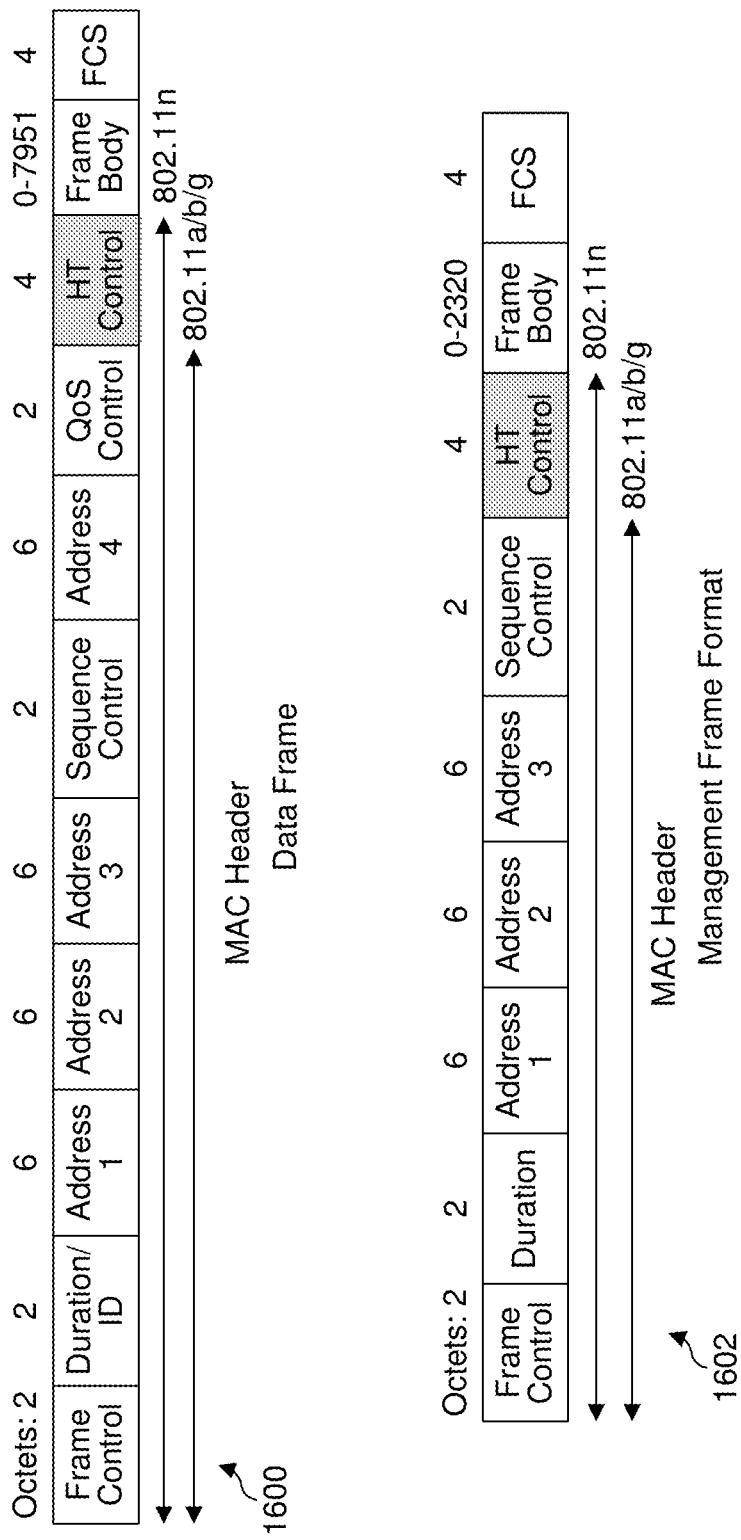
FIG. 16 is a diagram illustrating IEEE 802.11 MAC data frame and management frame formats.

FIG. 16 shows examples of an 802.11 MAC data frame format 1600 and MAC management frame format 1602. For 802.11a/b/g, the MAC header for the data frame includes a frame control field, Duration/connection ID field, three address fields, a sequence control field, fourth address field, and a QoS control field. The MAC header for the 802.11a/ b/g management frame includes a frame control field, a Duration field, three address fields, and a sequence control field. As shown, the MAC headers for each of the data frame and management frame formats for 802.11n further includes a 4-octet HT control field.

Figure 17:
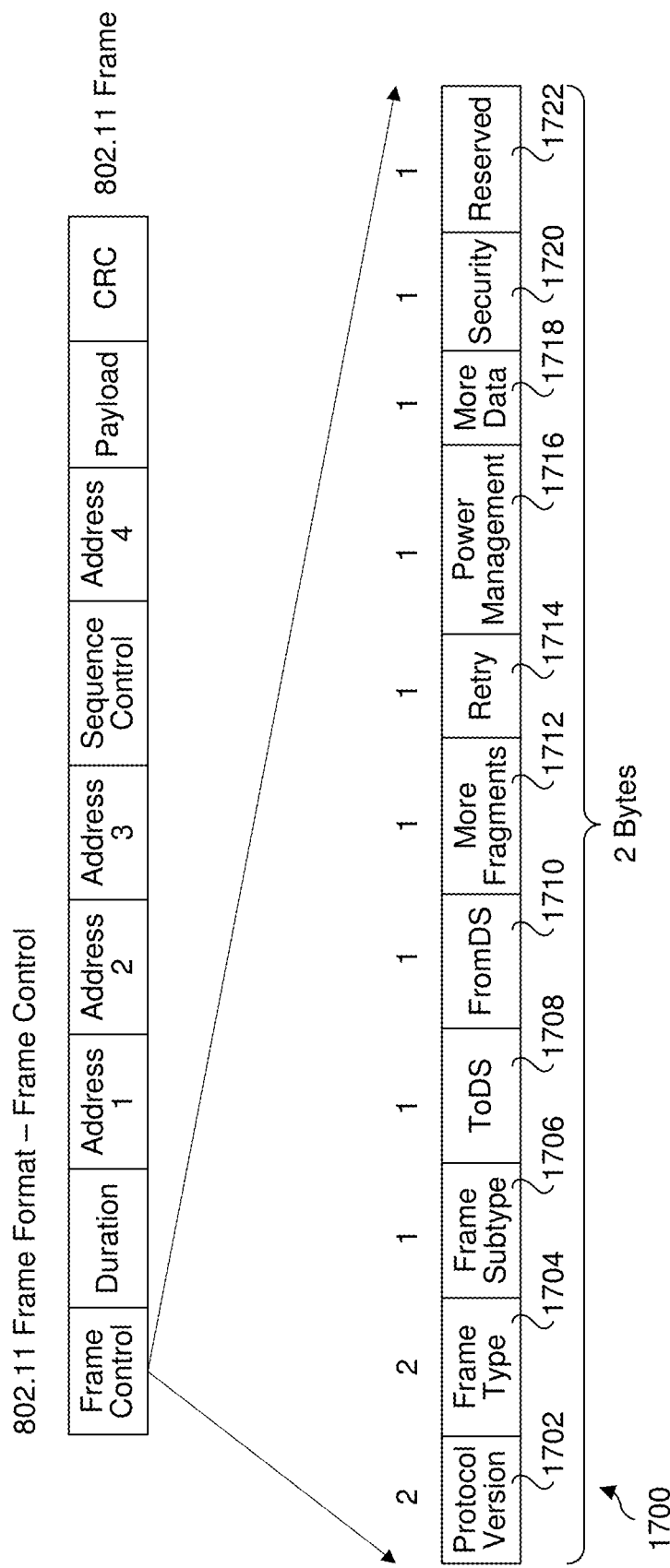
FIG. 17 is a diagram illustrating the IEEE 802.11 Frame Control format.

FIG. 17 shows further details of the frame control field 1700 of an 802.11 frame. The fields/flags include a 2-bit protocol version field 1702, a 2-bit frame type field 1704, a 4-bit frame sub-type field 1706, a ToDS bit 1708, a FromDS bit 1710, a more fragments bit 1712, a retry bit 1714, a power management flag 1716, a more data bit 1718, a 1-bit security bit 1720, and a reserved field bit 1722.

Figure 18A:
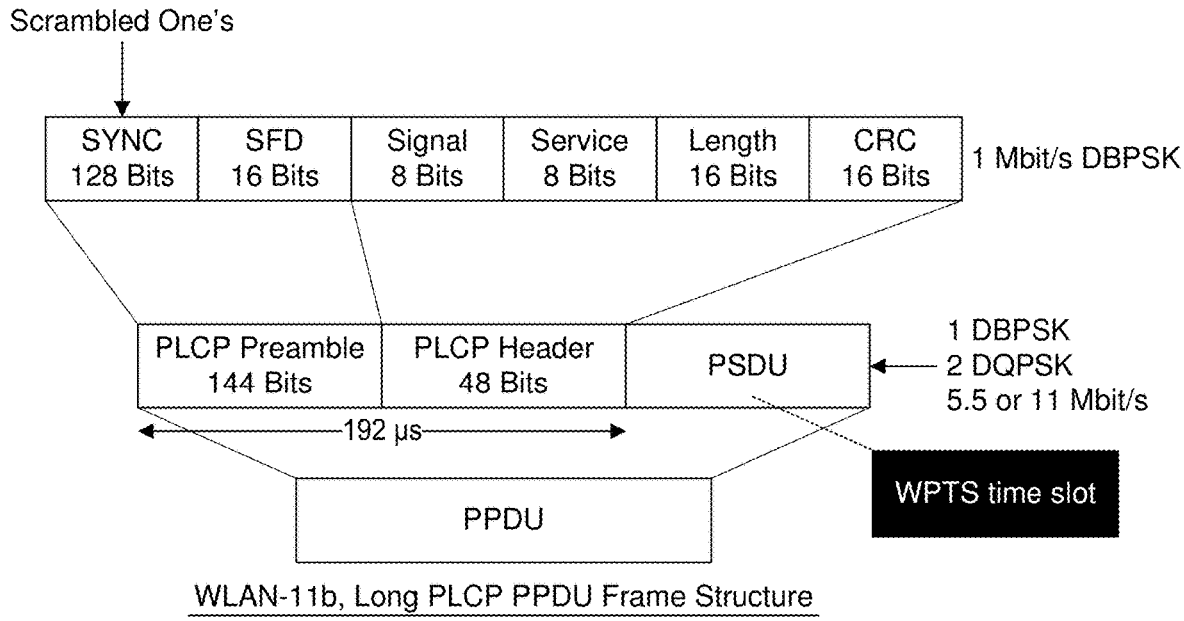
FIG. 18A is diagram illustrating implementation of a WPTS time slot using an IEEE 802.11b long PLCP PPDU frame structure.
Figure 18B:
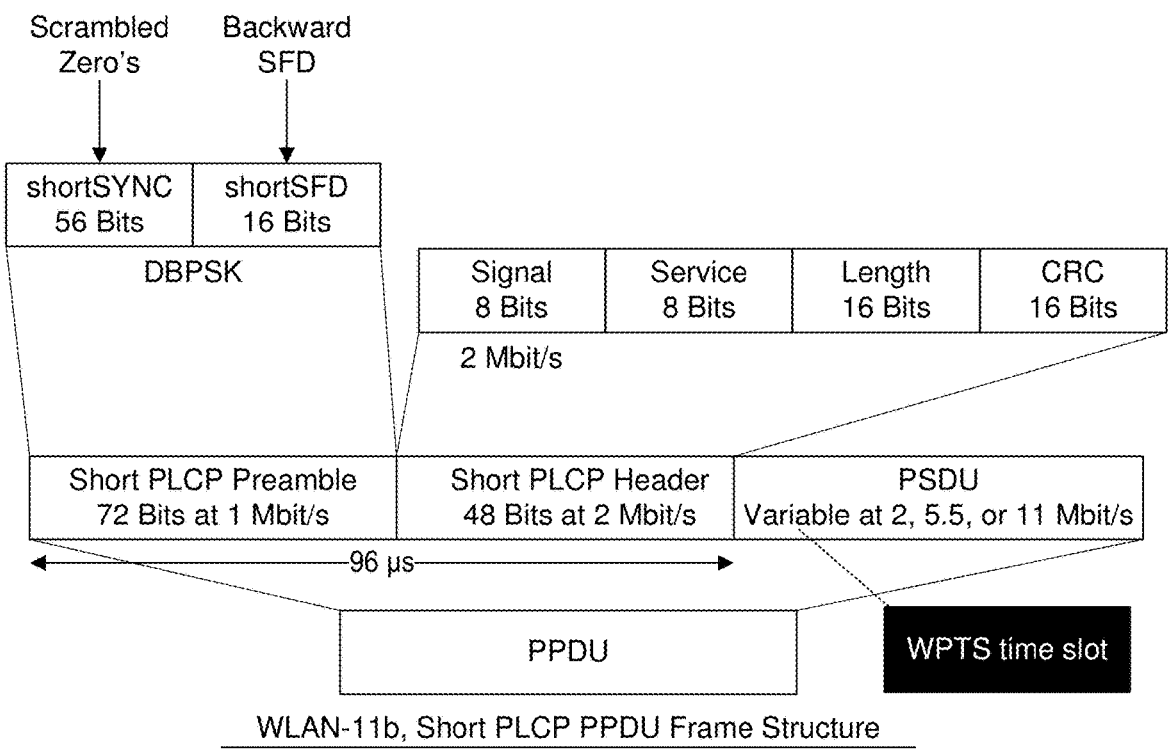
FIG. 18B is diagram illustrating implementation of a WPTS time slot using an IEEE 802.11b short PLCP PPDU frame structure.

FIGS. 18A and 18B respectively illustrate the long and short PLCP PPDU frame structures for 802.11b WLANs. Under the long PLCP PPDU frame structure of FIG. 18A, the PLCP preamble is 144 bits, and the PLCP header is 48 bits, followed by a variable-length PSDU. The short PLCP PPDU frame structure has a PLCP preamble of 72 bits with the same 48-bit PLCP header as the long PLCP PPDU frame structure. Under both frame structures, the preambles are transmitted at 1 Mbits/s and the PLCP headers are transmitted at 2 Mbits/s. Under the long PLCP PPDU frame structure, the PSDU can be transferred at 1, 2, 5.5, or 11 Mbits/s. For the short PLCP PPDU frame structure, the PSDU can be transferred at 2, 5.5, or 11 Mbits/s.

Figure 8B:
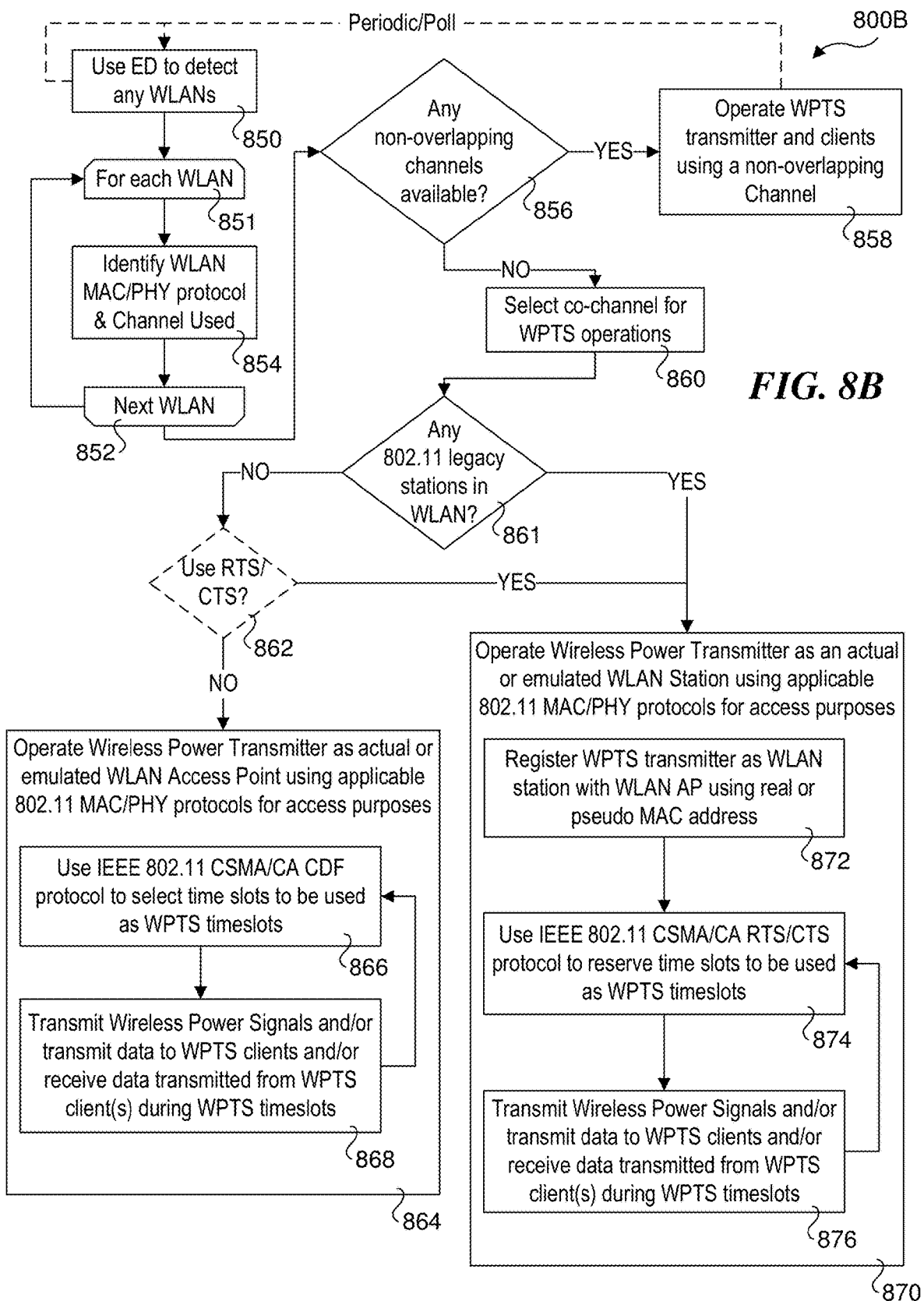
FIG. 8B shows a flowchart illustrating operations and logic for performing wireless power delivery in a manner that coexists with IEEE 802.11 WLANs, according to one embodiment.

FIG. 8B shows a flowchart 800B that may be used by a WPTS to support coexistence in shared wireless medium environments including one or more 802.11 WLANs, according to some embodiments. Generally, some of the operations of flowchart 800B may be implemented in associated operations in flowchart 800A described above and illustrated in FIG. 8A.

In a block 850, ED is used to detect the existence of any WLANs operating within the wireless environment used by the WPTS (i.e., within the WPTS operational environment). The operation of block 850 may also be performed periodically to detect changes to the WPTS operational environment, such as to detect the addition or removal of a WLAN within the WPTS operational environment. If one or more WLANs are detected within the frequency range of the WPTS utilized for transmitting wireless power signals, then the WPTS operational environment is a shared wireless media environment (i.e., the wireless media (airspace) is being shared by multiple wireless systems and/or networks.)

Presuming one or more WLANs are detected, the WLAN MAC/PHY protocol and channel is identified for each WLAN that is detected, as depicted by start and end blocks 851 and 852, and the operations of block 854. Next, in a decision block 856, a determination is made to whether there are any non-overlapping channels available. More specifically, a non-overlapping channel here in this context is a channel defined by the MAC/PHY protocol used by each of the WLANs identified in block 854 that does not overlap with any of the 802.11 channels currently in use by the WLANs. The radio band of such non-overlapping channels also needs to define a frequency range that encompasses any frequencies or radio bands to be utilized by the WPTS for WPTS operation. This is a relatively straightforward determination when the WLANs are implementing the same 802.11 protocols, or otherwise 802.11 protocols that use the same channels. However, when different 802.11 protocols are being used, this determination may be more complicated, since the channels defined for some of the 802.11 protocols differ, as shown above in FIGS. 10A-10C, for example.

If there is one or more non-overlapping channels available, the answer to decision block 856 will be YES, and the logic will proceed to a block 858 in which the WPTS transmitter and clients will be operated using an available non-overlapping channel. As illustrated, in some embodiments the WPTS may periodically check (e.g., via polling ED measurements) to detect any changes in the shared wireless medium environment, such as an addition or removal of a WLAN.

If there are no non-overlapping channels available, then the WPTS will utilize a channel being used by one of the WLANs sharing the wireless environment as a co-channel. In a block 860, the WPTS selects the co-channel to be used for WPTS operations. Next in a decision block 861, a determination is made to whether there are any legacy stations (802.11a, 802.11b) operating in the WLAN using the co-channel. As discussed above, if a WLAN has any legacy stations, it will be implementing a CSMS/CA scheme using the RTS/CTS protocol. Since the RTS/CTS protocol adds overhead and reduces throughput, in one embodiment the selection of the co-channel in block 860 may take this into consideration when there are other co-channels that could be selected that do not require support for legacy stations.

If the WLAN that will be sharing the selected co-channel does not have any legacy stations, the logic proceeds to an optional decision block 862 in which a determination is made to whether RTS/CTS is to be selectively used (although not required). There may be situations where the location of the WLAN stations and the location of the WPTS transmitter and WPTS clients are such that it may be advantageous to use RTS/CTS. In some embodiments, this determination may be made with the assistance of ED measurement made by one or more WPTS clients in addition to WPTS measurements made by the WPTS transmitter.

IF no RTS/CTS is to be used, the logic proceeds to a block 864 in which the WPTS transmitter is operated as an emulated WLAN access point using the applicable 802.11 MAC and PHY protocols for access purposes to the co-channel shared with the WLAN. From the perspective of any 802.11 devices (APs and stations) operating within the shared wireless medium environment, the WPTS appears to be another WLAN AP that is implementing the same 802.11 version as used by the co-channel WLAN. However, the WPTS doesn't perform full WLAN AP functionality, but rather only is implementing aspects of a WLAN AP used to gain access to the co-channel.

These aspects include the following. In a block 866, the WPTS transmitter uses the applicable 802.11 CSMA/CA CDF protocol to select time slots to be used as WPTS time slots. As discussed above, the CDF protocol provides random access to the shared co-channel, under which time slots are (effectively) opportunistically selected for subsequent transmission. In a block 868, the WPTS then uses the time slots it has selected using the CDF protocol for WPTS operations, which as discussed above, may involve one or more of transmitting power signals, transmitting data to WPTS clients, and receiving data transmitted by WPTS clients. As further shown, the operations of blocks 866 and 868 are repeated on an ongoing basis.

Returning to decision blocks 861 and 862, if the answer to either of these is YES, the logic proceeds to a block 870 in which the WPTS transmitter is operated as an actual or emulated WLAN station within the WLAN sharing the co-channel, again using the applicable 802.11 MAC and PHY protocols for channel access purposes. Since the RTS/CTS protocol involves communication between a WLAN AP and station to reserve a time slot, it is necessary for the WPTS transmitter to operate as a WLAN station if RTS/CTS is to be used. Accordingly, in a block 872, the WPTS registers with the WLAN AP as a WLAN station using a real or pseudo MAC address. Generally, every 802.11 device (AP or station) will include a six-octet MAC address that is guaranteed to be unique by the manufacturer of the device or the manufacturer of the radio subsystem used by the device. The MAC address is used for routing traffic within the WLAN, as well as for managing access to the channel. For emulated 802.11 devices, the device may or may not have a "real" MAC address, depending on the implementation. However, from the viewpoint of the WLAN AP, it is agnostic to whether a MAC address is a real address or a pseudo address, as long as the MAC address is unique within the WLAN.

In a block 874 the WPTS transmitter uses the 802.11 CSMA/CA RTS/CTS protocol to reserve time slots to be used as WPTS time slots. The WPTS then uses the reserved time slots for WPTS operations in a block 876. The operations of blocks 874 and 876 are then repeated in an ongoing manner.

Figure 3A:
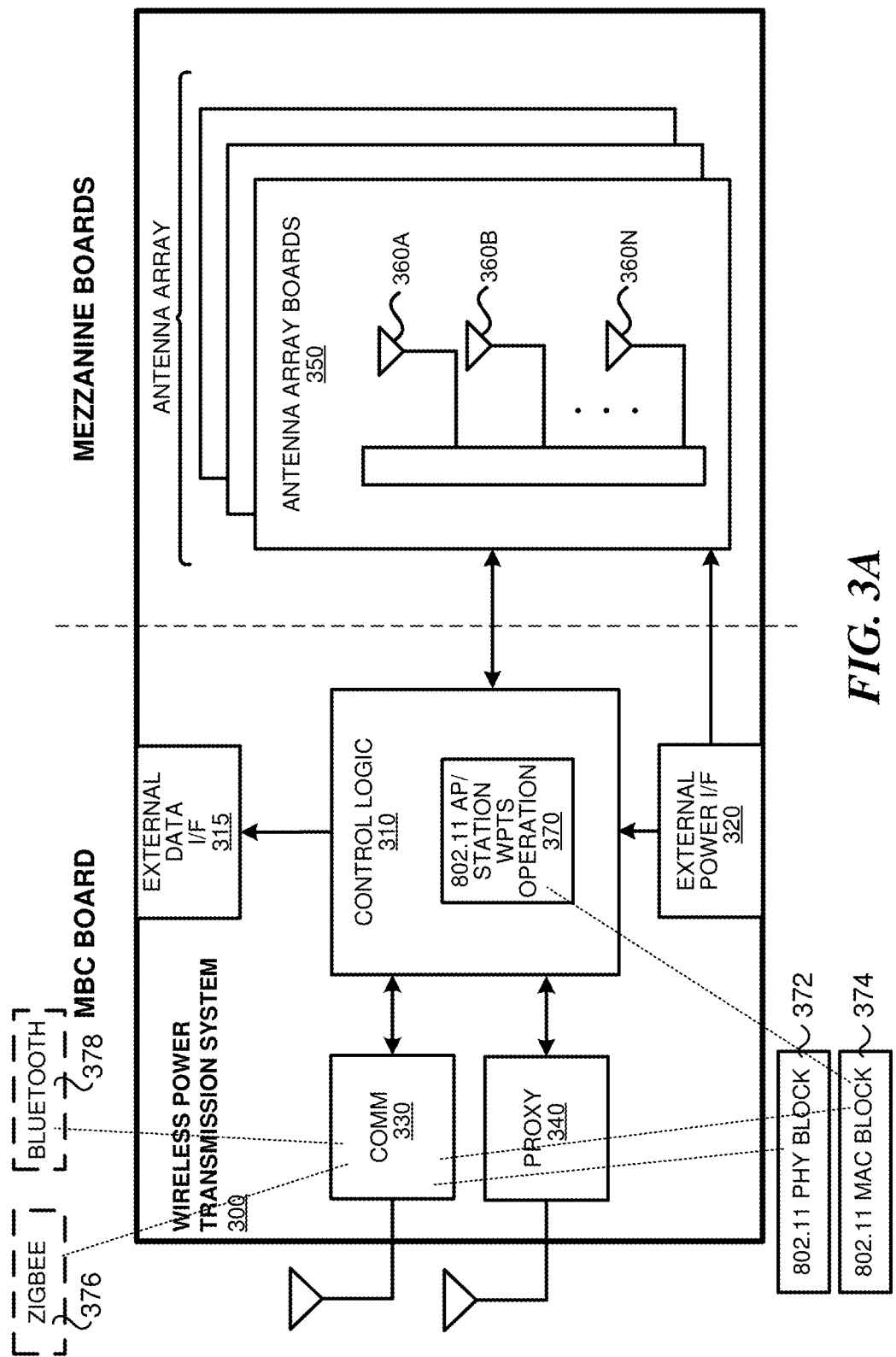
FIG. 3A depicts a block diagram illustrating additional components of a wireless power transmission system to support augmented IEEE 802.11 operations and coexistence with 802.11 WLANs in accordance with some embodiment.

To facilitate operation of the WPTS as an 802.11 WLAN access point or station while using the WPTS time slots for WPTS operations, corresponding logic and components are added to the WPTS architecture, as shown in the block diagram of FIG. 3A. An 802.11 AP/Station WPTS operation block 370 is added to control logic 310. This logic block is used for controlling the operation of the WPTS under which the WPTS functions as an 802.11 WLAN AP or WLAN station in the manner described above. Optionally, block 370 may be configured to only support operation of the WPTS as a WLAN AP or station (but not both).

Communication block 330 is depicted to further include an 802.11 PHY block 372, which is used to facilitate 802.11 operations at the physical layer. An 802.11 MAC block 374 may be implemented as part of communication block 330 or as part of an 802.11 AP/Station WPTS operation block 370, depending if the MAC layer is implemented in hardware or in software/firmware, or otherwise in embedded logic that is programmable. Communication block 330 also is depicted as including an optional ZigBee™ block 376 and an optional Bluetooth™ block 378.

Generally, PHY block 372 may be implemented via a PHY chip (when MAC block 374 is implemented separately), or PHY block 732 and MAC block 734 may be implemented on a MAC/PHY chip available from various manufactures, such as Broadcom, Cypress Semiconductor, Qualcomm, etc. Single chip MAC/PHY/Radio System on a Chip (SoC) components may also be used. Such SoC chips may also provide additional functionality, such as integrated Bluetooth™, and include integrated transmitter amplifiers and receiver circuitry. A customized chip may also be used, such as an MAC/PHY/Radio SoC that includes integrated ZigBee™.

WLAN Topology Discovery

Figure 19:
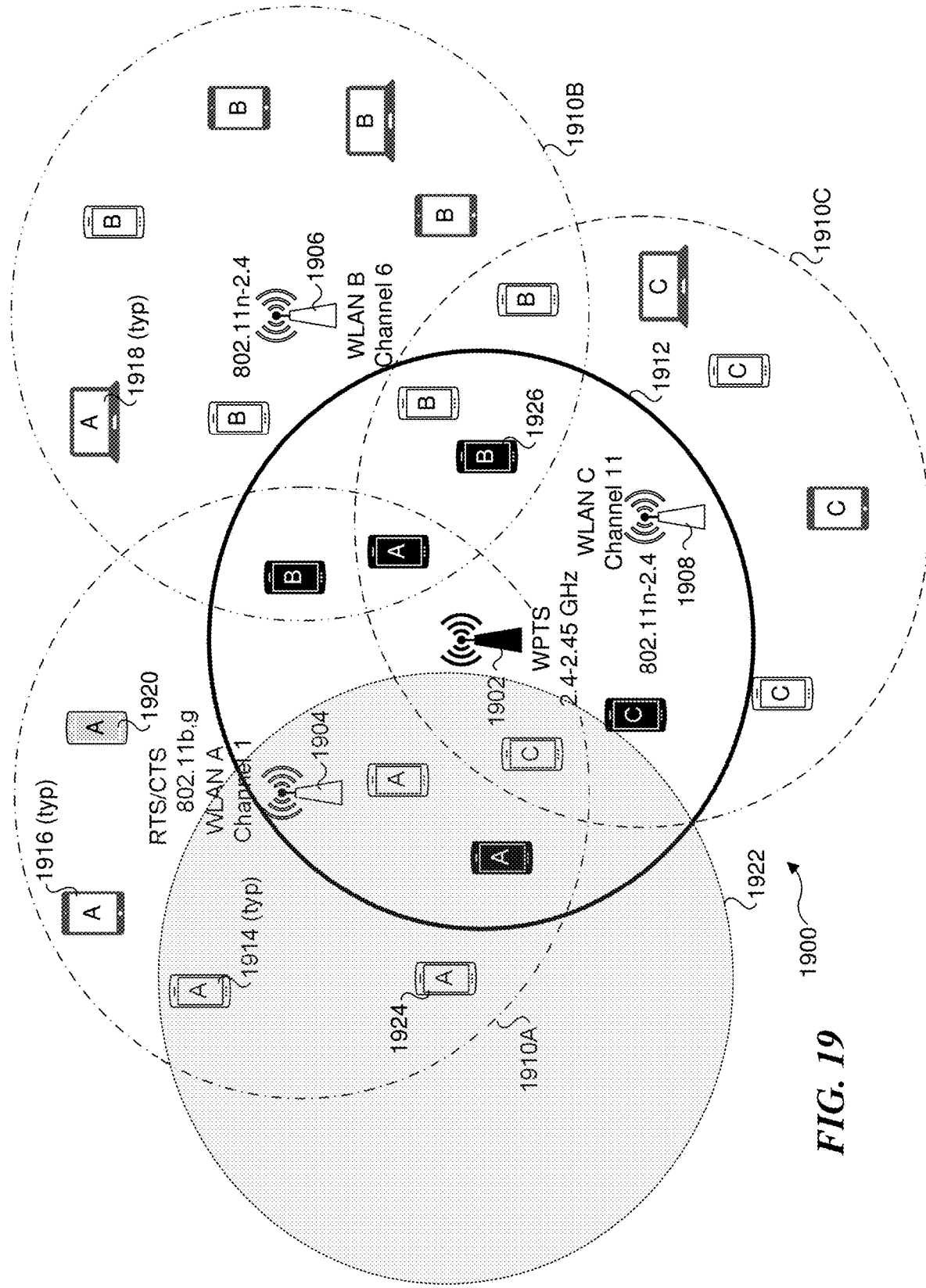
FIG. 19 is a diagram of an exemplary shared wireless medium environment including a WPTS and three WLANs with overlapping coverage areas.

In some instances, the WLAN topology of the shared wireless media environments in which a WPTS is implemented can be ascertained by the WPTS itself. FIG. 19 depicts a shared wireless media environment 1900 having such a WLAN topology. Shared wireless media environment includes a WPTS 1902 and three WLAN access points 1904, 1906, and 1908. Each of these WLAN access points is the access point for an associated WLAN, labeled WLAN A, B, and C. FIG. 19 shows a respective circle 1910A, 1910B, and 1910C representing the coverage areas of WLANs A, B, and C. The coverage area for a WLAN corresponds to the area in which the signal strength from the WLAN's access point is sufficient to meet the applicable 802.11 PHY requirements. For simplicity, the coverage areas are shown as circles; in reality, the shape of the coverage area for a given WLAN will vary, depending on the physical environment in which the WLAN is deployed.

FIG. 19 also shows a WPTS coverage area 1912, which again is shown as a circle for simplicity. As with WLANs, the coverage area for a WPTS will vary depending on the physical environment in which the WPTS is deployed. It is further noted that WPTS coverage area 1912 is depicted as having a nominal range from WPTS 1902. In practice, the WPTS coverage area may be adjusted by changing the power level of the WPTS wireless power signals.

As discussed above, the IEEE 802.11 WLAN protocols define a number of channels under which the WLAN may operate. When a new WLAN is added to a given environment, testing may reveal that there is interference on a given channel. Accordingly, the WLAN AP may be configured to operate on another channel. In the WLAN topology depicted in FIG. 19, the coverage areas 1910A, 1910B, and 1910C overlap, which may lead to interference issues if two or more of the WLANs were operating on the same channel. In this exemplary WLAN topology, WLAN A has been configured to operate on channel 1, while WLAN B utilizes channel 6 and WLAN C utilizes channel 11. In addition, each of WLANs B and C are labeled as 802.11n-2.4 networks, while WLAN A is being operated as an 802.11b,g network. As will be recognized by those skilled in the art, many 802.11n access points can service stations using other 802.11 versions, such as 802.11 b and g.

Each WLAN is further depicted as including multiple stations comprising mobile phones 1914, tablets 1916, and laptops 1918. The letters 'A', 'B', and 'C' on mobile phones 1914, tablets 1916, and laptops 1918 represent the WLAN each of these devices is associated with. Mobile phone 1920, which is depicted in gray, is a legacy device that can only support 802.11b signaling. Since a legacy device is being serviced by WLAN B access point 1906, WLAN A utilizes the 802.11 RTC/CTS protocol. Meanwhile, WLANs B and C utilize the 802.11 CSMA/CA CDF protocol.

The devices shown in black are WPTS clients. These WPTS client are configured to utilize wireless power signals transmitted by WPTS 1902, and are further configured to communicate with WPTS 1902 using one or more of an 802.11 protocol, ZigBee™, and Bluetooth™. WPTS 1902 is further configured to selectively transmit wireless power signals in the frequency range of 2.4-2.45 GHz, including transmitting using a single frequency or radio band within the radio band of a given 802.11 channel.

For simplicity and point of illustration, it is presumed in this example that the WLAN access points and the WPTS cannot "hear" transmissions beyond their respective coverage areas. In practice, the 802.11 radio chips used by 802.11 APs and stations may be configured to ignore any signals transmitted from other wireless devices (stations and APs) having a detected single strength below a threshold (e.g., the ED thresholds discussed above). As further depicted by a reception/transmission area 1922 corresponding to a mobile phone 1924, each WLAN station will have its own reception and transmission area.

With this in mind, it is observed that WPTS 1902 can "see" access points 1904 and 1908 for WLANs A and C, but cannot see WLAN B access point 1906 (i.e., doesn't detect transmissions from AP 1906. Thus, WPTS 1902 cannot use AP 1906 to determine what channel WLAN B is using (channel 6 in this example). As a result, WPTS 1902 might choose to use channel 6, since channel 6 is known to not interfere with channels 1 and 11. However, this may result in interference issues for any devices within the coverage area 1912 of the WPTS that are WLAN B stations (depicted with 'B'). In some embodiments, the channel determination for WLAN B may be obtained by listening to one or more WLAN B stations within coverage area 1912. However, there may be situations where the coverage area of the WPTS and the reception/transmission area of a WLAN station that is not also a WPTS client differ such that the WPTS cannot hear such a WLAN station.

One of the management frames defined for 802.11 WLANs is a beacon frame, which contains information about the WLAN, including an SSID, supported rates, Frequency-hopping (FH) Parameter Set, Direct-Sequence (DS) Parameter Set, Contention-Free (CF) Parameter Set, IBSS Parameter Set, and a Traffic indication map (TIM). Beacon frames are periodically transmitted from the WLAN's AP, and may be listened to by devices within the coverage area of the AP. For WLAN APs a WPTS can hear, the WLAN beacon frames can be used to obtain information about the WLAN's operational parameters.

Under some embodiments, a WPTS client may be configured to assist with WLAN topology discovery. For example, mobile phone 1926 is both a WLAN B station and a WPTS client, and can communicate with both WPTS 1902 and WLAN B AP 1906. Mobile WPTS client logic in mobile phone 1926 may be configured to access WLAN topology information from WLAN B AP 1906, thereby enabling WPTS 1902 to be apprised of WLAN B stations that it otherwise cannot detect by for which WPTS transmission may cause interference.

Under some embodiments, the Control and Provisioning of Wireless Access Points (CAPWAP) Protocol Specification defined by RFC 5415 may be used by the WPTS to communicate with the WLAN AP when the WPTS is operating as an actual or emulated WLAN AP. Alternatively, the WPTS may communicate with an Access Controller (AC) that is used to manage a collection of Wireless Termination Points (WTPs, which is what some WLAN APs are referred in the specification).

Under some shared wireless medium environment topologies, the coverage area of a WPTS and a particular WLAN may overlap, but there may not be any WLAN stations for that particular WLAN within that coverage area. Additionally, under some embodiments, a WPTS and a WLAN AP may be co-located (as separate systems), or a WPTS may be configured to support full WLAN AP functionality, including routing functionality and connection to a wired network. In these cases, a wireless device that is within the coverage area of the WPTS/AP or co-located AP and within the coverage area of another WLAN may select to not join the other WLAN.

As a result, coexisting operations of the WPTS and the other WLAN may be supported using the same channel (or one or more frequencies within the channel) under which the channel is not shared. Since there are not stations for the other WLAN within the coverage area of the WPTS, transmission of WPTS power signals on the channel (or within the channel) will not interfere with any of the other WLAN's stations.

Returning to FIG. 19, each of WLANs A, B, and C include WLAN stations within WPTS coverage area 1912. Since WPTS can only transmit wireless power signals using frequencies up to 2.45 GHz, WPTS cannot use channel 14. Thus, WPTS will select one of WLANs A, B, or C to operate as a co-channel network with. This decision (which WLAN to choose) may be based on various considerations, such as how many WPTS clients are being operated as stations in a particular WLAN, how many stations are operating within each WLAN, and operational parameters of the WLANs. In some embodiments it may be preferable to select a WLAN that does not need to support legacy devices (and thus using RTS/CTS). In some embodiments, it may be preferable to select a WLAN with the least (current) utilization, since the fair sharing schemes would result in more of the channel time slots being used as WPTS timeslots. To facilitate the determination of how many stations are present in each WLAN, under some environments WLAN APs may be configured to communicate with one another using a distributed management protocol under which the WLANs exchange topography information.

Opportunistic RTS/CTS Operation

The WPTS may be configured to implement an opportunistic RTS/CTS operation to utilize more of the channel (when viewed from a time basis) than conventional RTS/CTS operation, while still operating in a manner that coexists with the WLAN. As discussed above, under RTS/CTS a station requesting access to the channel sends an RTS frame. This is followed by a CTS frame that is returned to the station that sent the RTS frame. The CTS frame has a MAC header that includes a 2 octet duration value in microseconds.

The WPTS can take advantage of the following scenario. Under some embodiments the WPTS can use ED to detect the signal strength of the station sending the RTS frame. If that signal strength falls below a threshold, such as the ED threshold defined for the 802.11 version being used in the WLAN, then the WPTS may transmit power signals during the same period defined by the duration in the CTS returned to the requesting station (the time slot reserved by the requesting station)—that is the station receiving the CTS and the WPTS may transmit at the same time during the reserved time slot since the transmitted power signals from the WPTS will not interfere with the requesting stations transmissions. Alternatively, if the WPTS cannot "hear" a CTS (e.g., under a standard PHY configuration for the applicable 802.11 version), but can "hear" an RTS, the WPTS can transmit power signals during the time slot reserved by the requesting station. Under this latter approach, a separate ED threshold detection is not needed, as the PHY will be configured to ignore any communications that fall below a predefined sensitivity level.

As situation under which the WPTS will not be able to detect RTS frames, but will be able to detect CTS frames is illustrated in FIG. 19. For example, WPTS 1902 will not be able to detect CTS frames transmitted from any of the WLAN stations in WLAN A that are outside of WPTS coverage area 1912, but will be able to detect all of the CTS frames since WLAN A AP 1904 is within WPTS coverage area 1912.

In some embodiments, a WPTS may utilize multiple co-channels, or use a combination co-channel and opportunistic RTS/CTS scheme. For example, under share wireless medium environment 1900, WPTS 1902 may utilize either channel 6 or channel 11 for co-channel operation with WLAN B or WLAN C, while listening to the RTS and CTS frames transmitted in WLAN A, and using channel 1 for time slots that are detected as being reserved by WLAN A stations that are outside of WPTS coverage area 1912.

Sharing Access to Wireless Medium Using Devices with Multiple PHYs

In accordance with further aspects of some embodiments, techniques are provided for devices with multiple PHYs to access shared wireless medium environments under which a first PHY and associated MAC is used to select or reserve time slots, while a second PHY is used to transmit and/or receive signals during those time slots. An exemplary embodiment illustrating such a device and how it is implemented is shown in diagram 2000 of FIG. 20.

A multi-PHY host device 2002 includes a single or multiple-mode PHY 2004 (also labeled and referred to as PHY 1) and a separate PHY 2006 (also labeled and referred to as PHY 2). A MAC 2008 is depicted above PHY 1 and the dashed outline 2010 indicates that PHY 1 and MAC 2008 may be implemented on the same chip, such as the same radio sub-system chip. Meanwhile, a MAC 2012 depicted above PHY 2 is shown as a dashed block to indicate it is optional. For simplicity other aspects of the PHY and multi-PHY host device 2002 are not shown such as transmit and receive amplifiers and antennae.

The left-hand side of diagram 2000 depicts operations performed by PHY 1 and MAC 2008. These operations begin at a start block 2014. In a block 2016, the presence of one or more WLANs operating in the shared wireless medium are detected. This can generally be performed using the techniques described above with reference to FIGS. 8A and 8B. Under the illustrated scheme, PHY 1 is a single or multi-mode PHY, meaning it may be configured to implement a single PHY or multiple PHYs. For example, in the context of IEEE 802.11, a single PHY might be any of 802.11a, 802.11b, 802.11g, 802.11n, and 802.11 ac. In the case of a multi-mode PHY, the PHY supports multiple different PHYs (referred to as PHY modes) under which the signaling used by the different PHYs is different. For example, 802.11b uses DSSS, while 802.11a and 802.11g uses OFDM and 802.11n and 802-1 lac use MIMO-OFDM.

In the case of a multi-mode PHY, PHY 1 will scan the available channels for one or more of its PHY modes to detect the presence of a WLAN utilize that channel and a PHY corresponding to the PHY mode. This is depicted by start and end loop blocks 2018 and 2022, and a decision block 2020. When a PHY and channel is detected to be in use in decision block 2020, that PHY and channel is added to a list of WLANs operating in the shared wireless medium environment.

Figure 20:
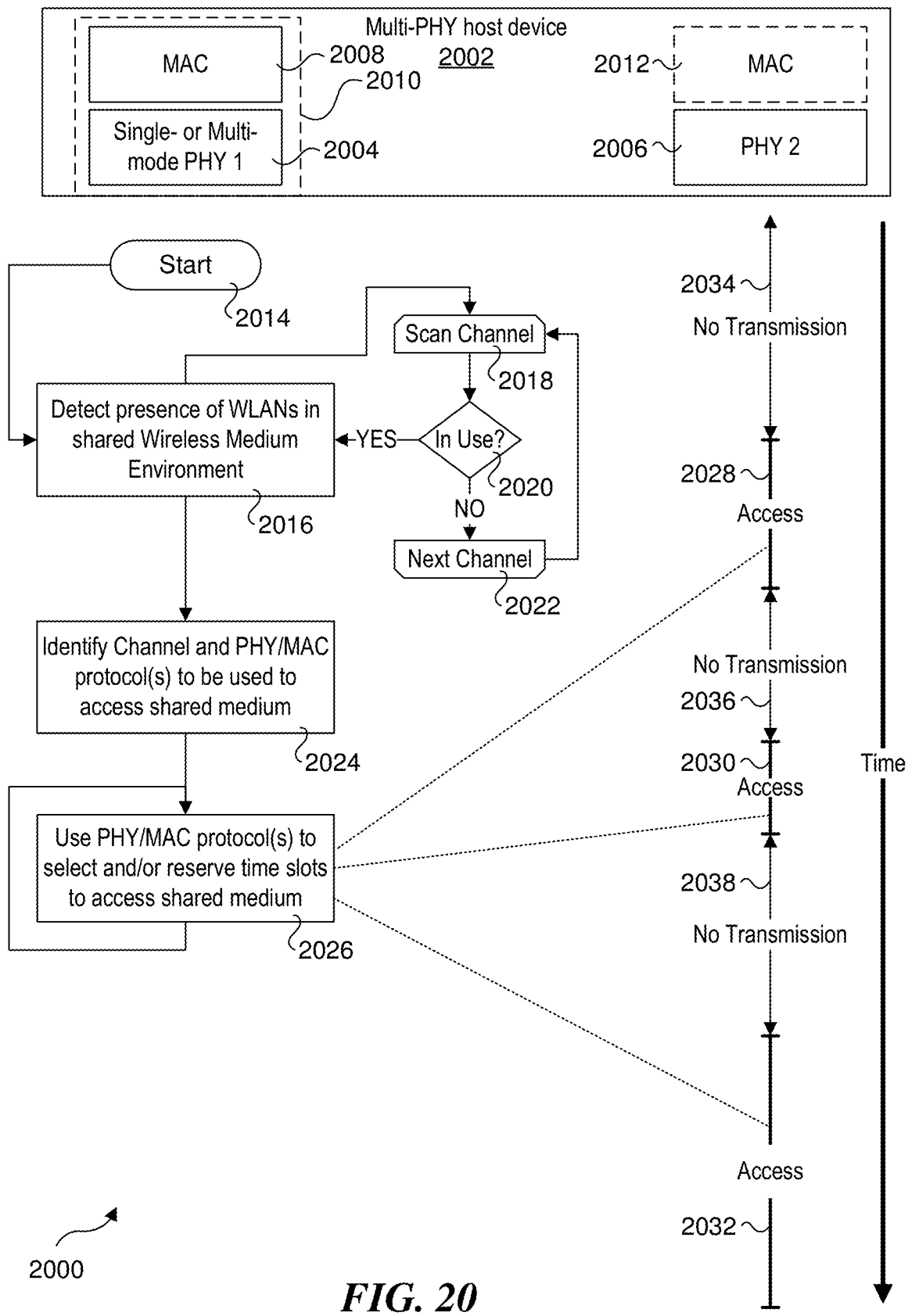
FIG. 20 is a diagram illustrating operations of a multi-PHY host device to select and/or reserve time slots for accessing a shared wireless medium using a first PHY, and to access the shared wireless medium during those time slots using a second PHY.

Upon completion of block 2016, the logic proceeds to a block 2024 in which a channel and PHY/MAC protocol(s) to be used to access the shared wireless medium are identified. For example, suppose channel 1 of an IEEE 802.11g WLAN is to be used. The PHY and MAC protocols will be the corresponding PHY and MAC protocols defined by the IEEE 802.11g WLAN specification. It is noted that the embodiment of FIG. 20 is not limited to IEEE 802.11 WLANs, but rather may be implemented in a shared wireless medium environment in which one or more WLANs using any existing or future WLAN standard are operating. In some embodiments, the PHY/MAC is considered to be a single protocol that covers both the operation of the PHY Layer and the MAC Layer.

In a block 2026 the PHY/MAC protocol(s) are used to select and/or reserve time slots to access the shared wireless medium. For IEEE 802.11 WLANs, this can be done in the manner discussed above, e.g., using CSMA-CA with a CFD algorithm to select time slots or using an RTS/CTS scheme to reserve time slots. For other types of existing and future WLANs, appropriate techniques for selecting and/or reserving time slots (as applicable) may be used. As shown by the loop back to itself, the operations of block 2026 are performed on an ongoing basis.

Figure 21:
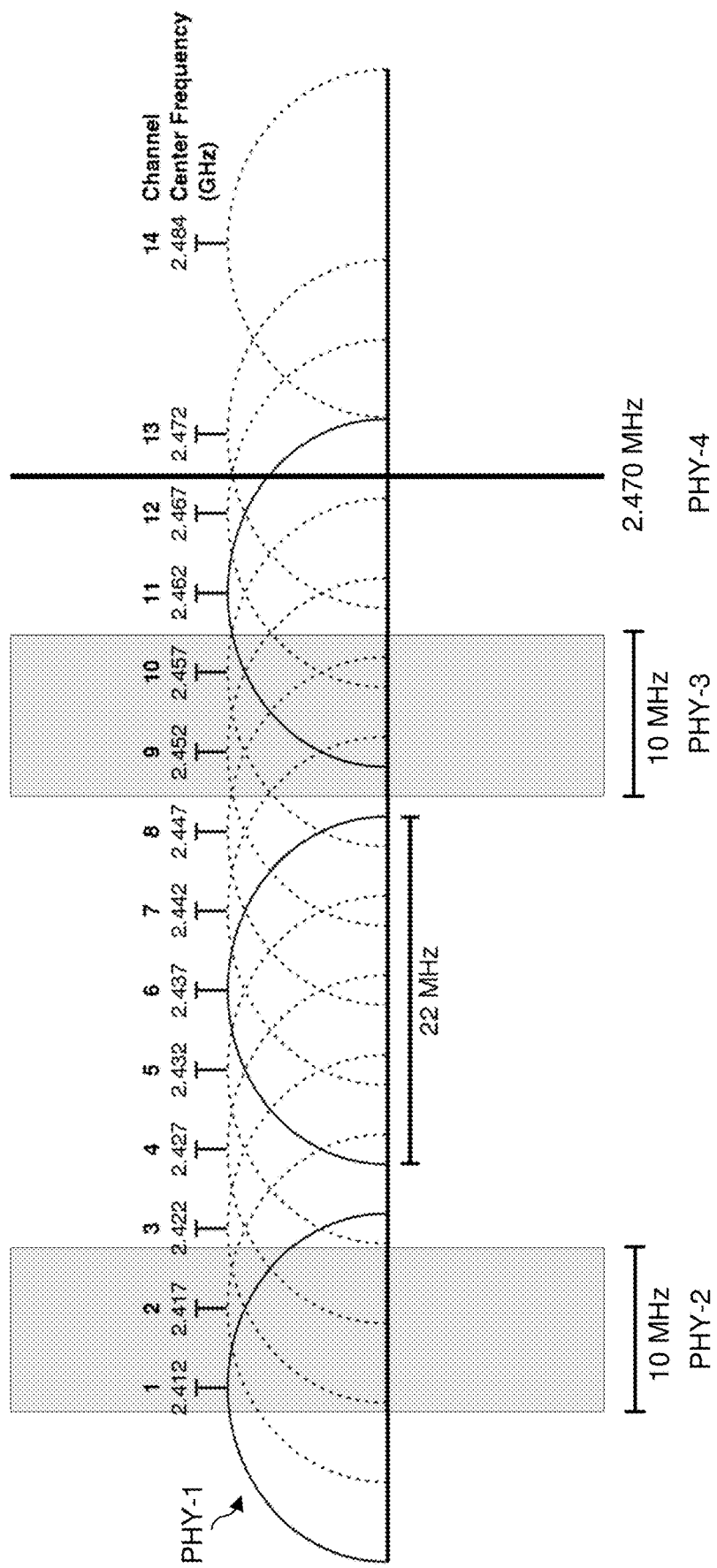
FIG. 21 is a diagram illustrating three examples of overlapping conditions.

The right-hand side of diagram 2000 depicts utilization of PHY 2 to access the shared wireless medium. PHY 2 is going to be using a different PHY than PHY 1. For example, in some embodiments, PHY 1 will be an IEEE 802.11 PHY, while PHY 2 will be a non-IEEE 802.11 PHY. In some embodiments, the frequency or radio band used by PHY 2 will overlap the radio band of the channel used by PHY 1, as illustrated in FIG. 21 below.

As illustrated, PHY 2 will access the shared wireless medium at time slots 2028, 2030, and 2032, which were selected and/or reserved using PHY 1 and an associated MAC in block 2026. During time periods 2034, 2036, and 2038 PHY 2 will not transmit signals, although in some embodiments it may receive signals transmitted by other devices (not shown) using PHY 2. During the access time slots 2028, 2030, and 2032, PHY 2 may be used to transmit and/or receive signals. As discussed above, in some embodiments, PHY 2 may employ MAC 2012 during these time slots. Optionally, under other embodiments a MAC is not used.

FIG. 20 illustrated three examples of "overlapping" as used herein, including the claims. PHY-1 uses the same channel diagram as illustrated in FIG. 9A, which illustrates the channel spacing of an 802.11b and 802.11g WLAN operating at 2.4 GHz. PHY-2 is depicted that has a radio band having a width of 10 MHz that is entirely contained within the 22 MHz radio band of channel 1. PHY-3 is depicted to have a 10 MHz radio band that partially overlaps channel 11. PHY-4 uses a single 2.470 MHz frequency that is within the radio band of channel 11. Similar overlapping may be implemented for other WLANs. It is further noted that the 10 MHz radio band width is exemplary, as a given PHY may implement radio bands having different bandwidths.

Exemplary Wireless Power Receiver Client (WPTS Client)

Figure 22:
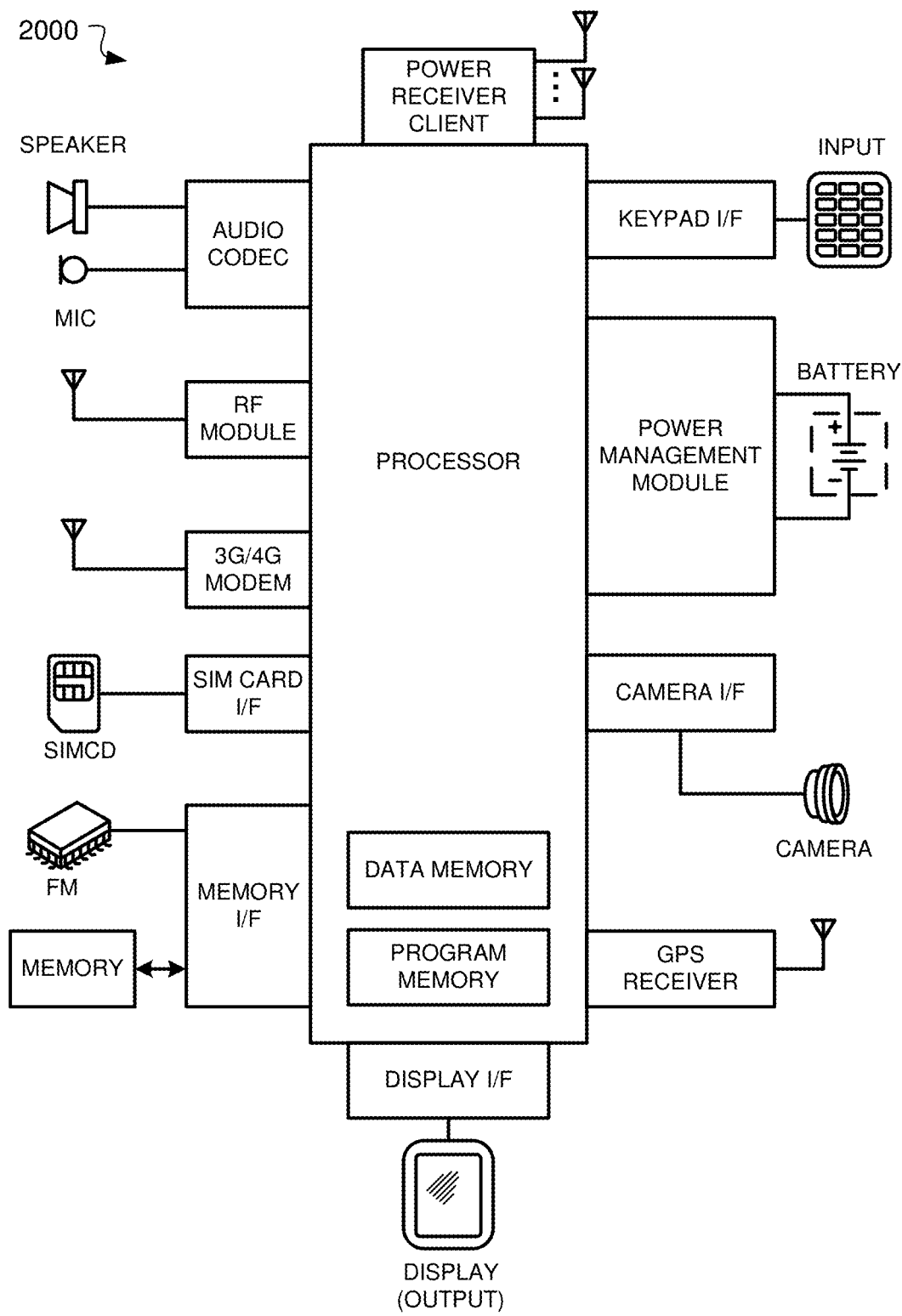
FIG. 22 depicts a block diagram illustrating example components of a representative mobile device or tablet computer with one or more wireless power receiver clients in the form of a mobile (or smart) phone or tablet computer device in accordance with some embodiments.

FIG. 22 depicts a block diagram illustrating example components of a representative mobile device or tablet computer 2200 with a wireless power receiver or client in the form of a mobile (or smart) phone or tablet computer device, according to an embodiment. Various interfaces and modules are shown with reference to FIG. 22; however, the mobile device or tablet computer does not require all of the modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee™ radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a power transmission system, e.g., wireless power transmission system 101 of FIG. 1.

Figure 23:
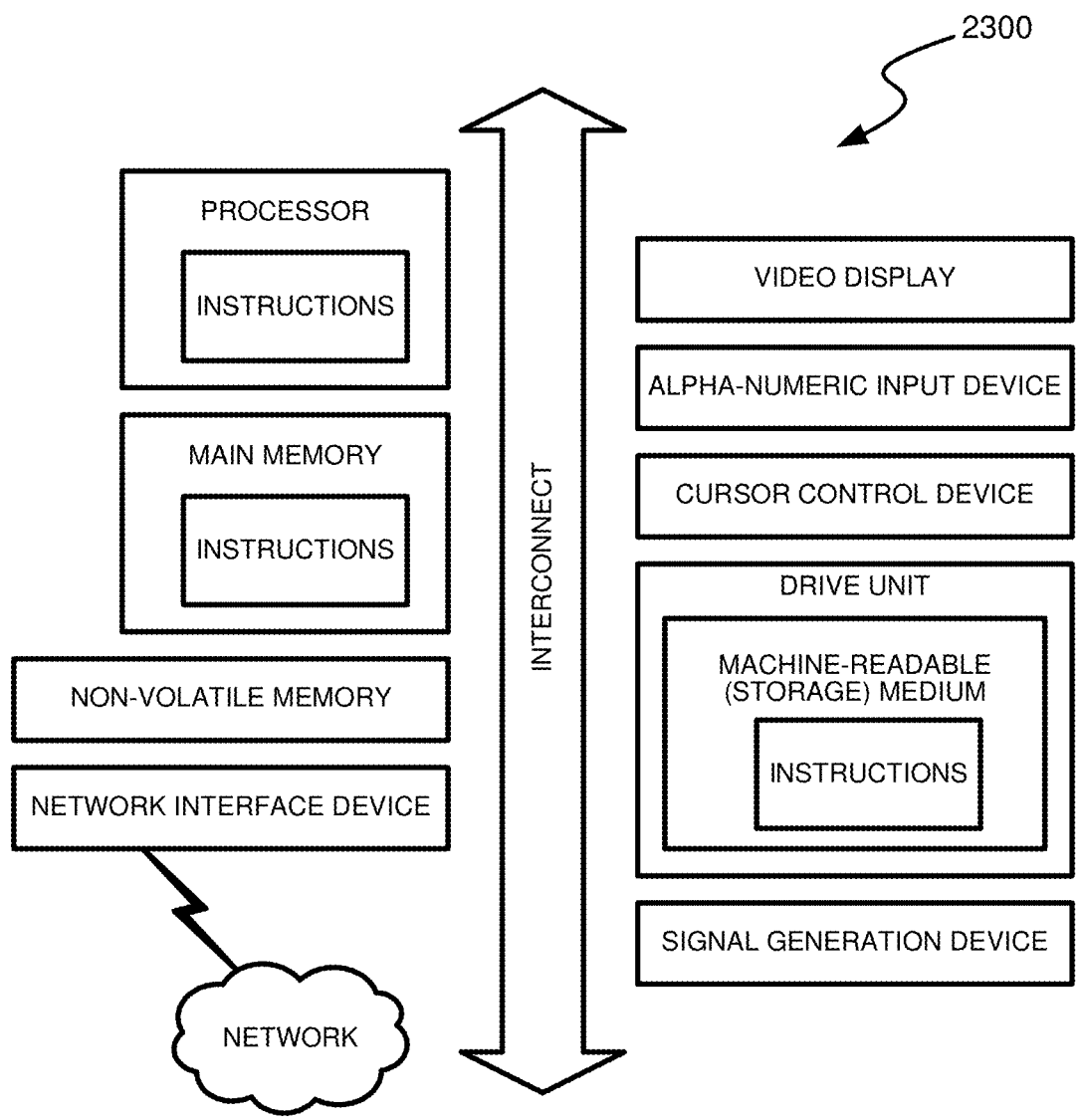
FIG. 23 depicts a diagrammatic representation of a machine, in the example form, of a computer system within which a set of instructions, for causing the machine to perform any one or more of the methodologies discussed herein, may be executed.

FIG. 23 depicts a diagrammatic representation of a machine, in the example form, of a computer system within which a set of instructions, for causing the machine to perform any one or more of the methodologies discussed herein, may be executed.

In the example of FIG. 23, the computer system includes a processor, memory, non-volatile memory, and an interface device. Various common components (e.g., cache memory) are omitted for illustrative simplicity. The computer system 2300 is intended to illustrate a hardware device on which any of the components depicted in the example of FIG. 1 (and any other components described in this specification)

can be implemented. For example, the computer system can be any radiating object or antenna array system. The computer system can be of any applicable known or convenient type. The components of the computer system can be coupled together via an interconnect, such as a PCIe (Peripheral Component Interconnect Express) interconnect. For simplicity, a single interconnect is shown in FIG. 23; in practice an interconnect hierarchy may be used, as will be recognized by those skilled in the computer arts.

The processor may be, for example, a conventional microprocessor such as an Intel® or AMD® microprocessor or an ARM-based microprocessor. Those skilled in the computer arts will recognize that the terms "machine-readable (storage) medium" or "computer-readable (storage) medium" generally include any type of device that can store instructions and or data that is accessible by the processor.

The memory is coupled to the processor by, for example, one or more memory channels connecting the memory to a memory controller in the processor (not shown). The memory can include, by way of example but not limitation, random access memory (RAM), such as dynamic RAM (DRAM) and static RAM (SRAM).

The interconnect or interconnect hierarchy also couples the processor to the non-volatile memory and drive unit. The non-volatile memory and/or drive unit may generally be any device capable of storing data in a non-volatile manner, such as a solid state drive (SSD), a magnetic-optical disk, an optical disk, a read-only memory (ROM), an EPROM, or EEPROM, a magnetic or optical card, or a Flash memory device.

Software is typically stored in the non-volatile memory and/or the drive unit and loaded into volatile memory (e.g., RAM) prior to execution. Indeed, for large programs, it may not be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The interconnect also couples the processor to the network interface device. The interface can include one or more of a modem or network interface. It will be appreciated that a modem or network interface can be considered to be part of the computer system. The interface can include an Ethernet interface or Network Interface Controller (NIC), an InfiniBand Host Channel Adaptor (HCA), an ISDN modem, a cable modem, token ring interface, a wireless network interface (e.g., IEEE 802.11 radio), a satellite transmission interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 23 reside in the interface.

In operation, the computer system 2300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In general, the circuitry, logic and components depicted in the figures herein may also be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to ASICs, FPGAs, IP block libraries, or through one or more of software or firmware instructions executed on one or more processing elements including processors, processor cores, controllers, microcontrollers, microengines, etc.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the various aspects of the disclosure are contemplated in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the embodiments of the subject application. Some alternative implementations of the embodiments of the subject application may include not only additional elements to those implementations noted above, but also may include fewer elements. These and other changes can be made to the embodiments of the subject application in light of the above Detailed Description. While the above description defines certain examples of the embodiments of the subject application, and describes the best mode contemplated, no matter how detailed the above appears in text, the embodiments of the subject application can be practiced in many ways. Details of the system may vary considerably in its specific implementation, while still being encompassed by the embodiments of the subject application disclosed herein. As noted above, particular terminology used when describing certain features or aspects of the embodiments of the subject application should not be taken to imply that the terminology is being redefined herein to be restricted to any specific characteristics, features, or aspects of the embodiments with which that terminology is associated. In general, the terms used in the following claims should not be construed to limit the embodiments to the specific examples disclosed in the specification, unless the specification explicitly defines such terms. Accordingly, the actual scope of the embodiments of the subject application encompasses not only the disclosed examples, but also all equivalent ways of practicing or implementing the embodiments of the subject application.

The above description of illustrated embodiments, including what is described in the Abstract, is not intended to be exhaustive or to limit the embodiments of the subject application to the precise forms disclosed. While specific embodiments, and examples thereof, are described herein for illustrative purposes, various equivalent modifications are possible within the scope of the embodiments, as those skilled in the relevant art will recognize.

These modifications can be made to the embodiments in light of the above detailed description. The terms used in the following claims should not be construed to limit the application to the specific embodiments disclosed in the specification and the drawings. Rather, the scope of the embodiments is to be determined entirely by the following claims, which are to be construed in accordance with established doctrines of claim interpretation.

What is claimed is:

1. A wireless power transmission system (WPTS), comprising:
    an antenna array comprising radio frequency (RF) antennas; and
    control logic that is operatively coupled to the antenna array to perform operations, comprising:
        detecting one or more data encoded-based wireless networks within a shared wireless medium environment comprising the WPTS; and
        based on respective determined phases of a beacon signal that has been received via respective antennas of the RF antennas, transmitting respective power signals from the respective antennas to one or more wireless power receiver clients using a channel that has been determined to be utilized by at least one of the one or more data encoded-based wireless networks.

2. The wireless power transmission system of claim 1, wherein the one or more data encoded-based wireless networks comprise an Institute of Electrical and Electronics Engineers (IEEE) 802.11 wireless local area network (WLAN), and wherein the channel has been determined to be utilized by the IEEE 802.11 WLAN.

3. The wireless power transmission system of claim 2, wherein the transmitting of the respective power signals further comprises:
    selecting, using an IEEE 802.11 Media Access Channel (MAC) protocol, WPTS time slots during which the WPTS is to access the shared wireless medium environment; and
    transmitting, using the channel, the respective power signals to the one or more wireless power receiver clients during at least a portion of at least a time slot of the WPTS time slots.

4. The wireless power transmission system of claim 3, wherein the operations further comprise:
    during at least the portion of at least the time slot of the WPTS time slots, at least one of transmitting data to the one or more wireless power receiver clients or receiving transmissions from the one or more wireless power receiver clients.

5. The wireless power transmission system of claim 3, wherein the IEEE 802.11 MAC protocol supports a carrier-sense multiple access with collision avoidance (CSMA/CA) protocol employing a distributed coordination function, and wherein the transmitting of the respective power signals further comprises:
    based on the CSMA/CA protocol, transmitting, using the channel, the respective power signals to the one or more wireless power receiver clients.

6. The wireless power transmission system of claim 5, wherein the operations further comprise:
    operating the WPTS as an IEEE 802.11 WLAN access point device or an emulated IEEE 802.11 WLAN access point device for management of access to the shared wireless medium environment using the CSMA/CA protocol.

7. The wireless power transmission system of claim 1, wherein the operations further comprise:
- identifying a data encoded-based wireless network of the one or more data encoded-based wireless networks that utilizes a carrier-sense multiple access with collision avoidance (CSMA/CA) protocol to access the channel; and
- based on the CSMA/CA protocol,
  - reserving time slots, and
  - at least one of transmitting, during the time slots via the channel, the respective wireless power signals to the one or more wireless power receiver clients, or receiving, during the time slots via the channel, a transmission from a wireless power receiver client of the one or more wireless power receiver clients.

8. The wireless power transmission system of claim 1, wherein the transmitting further comprises:
- in response to determining a change in utilization of the shared wireless medium environment representing that the channel has become available, transmitting the respective power signals to the one or more wireless power receiver clients.

9. The wireless power transmission system of claim 1, wherein the transmitting further comprises:
- identifying WPTS time slots during which the WPTS is to access the shared wireless medium environment; and
- transmitting, during at least a portion of at least a time slot of the WPTS time slots via the channel, the respective wireless power signals to the one or more wireless power receiver clients.

10. The wireless power transmission system of claim 1, wherein the one or more data encoded-based wireless networks comprises Institute of Electrical and Electronics Engineers (IEEE) 802.11 wireless local area network (WLANs), and wherein the channel has been determined to be utilized by a device of the IEEE 802.11 WLANs.

11. A wireless power transmission system (WPTS) comprising:
- an antenna array comprising radio frequency (RF) antennas;
- a detector that detects one or more data encoded-based wireless networks in a shared wireless medium environment comprising the WPTS; and
- a transmitter that transmits, based on respective determined phases of a beacon signal that has been received via the antenna array, respective power signals from multiple antennas of the RF antennas to one or more wireless power receiver clients using at least one channel that is being utilized by at least one of the one or more data encoded-based wireless networks.

12. The wireless power transmission system of claim 11, wherein the one or more data encoded-based wireless networks comprise an Institute of Electrical and Electronics Engineers (IEEE) 802.11 wireless local area network (WLAN), and wherein the transmitter, based on a determination that a channel of the at least one channel is being utilized by the IEEE 802.11 WLAN, transmits, via the channel, a portion of the respective wireless power signals to a wireless power receiver client of the one or more wireless power receiver clients.

13. The wireless power transmission system of claim 12, wherein the portion is a first portion, and wherein the transmitter, based on a selection, using an IEEE 802.11 Media Access Channel (MAC) protocol, of WPTS time slots during which the WPTS is to access the shared wireless medium environment, transmits, during at least a second portion of the WPTS time slots via the channel, the first portion of the respective wireless power signals to the one or more wireless power receiver clients.

14. The wireless power transmission system of claim 13, wherein the IEEE 802.11 MAC protocol supports a carrier-sense multiple access with collision avoidance (CSMA/CA) scheme employing a distributed coordination function, and wherein the CSMA/CA scheme supports sharing of the channel.

15. A method, comprising:
- detecting, by a wireless power transmission system (WPTS) comprising a processor, operation of a data encoded-based wireless network in a shared wireless medium environment comprising the WPTS, wherein the data encoded-based wireless network utilizes a corresponding frequency or channel; and
- facilitating, by the WPTS, operating the WPTS concurrently with the operation of the data encoded-based wireless network, wherein the WPTS comprises an antenna array comprising radio frequency (RF) antennas, wherein the WPTS transmits, based on a beacon signal that has been received via respective antennas of the RF antennas, power signals from the respective antennas to a wireless power receiver device using a frequency or a channel that overlaps the corresponding frequency or channel utilized by the data encoded-based wireless network.

16. The method of claim 15, wherein the data encoded-based wireless network comprises an Institute of Electrical and Electronics Engineers (IEEE) 802.11 wireless local area network (WLAN), and the method further comprising:
- detecting, by the WPTS for the IEEE 802.11 WLAN,
  - the corresponding channel being utilized by the IEEE 802.11 WLAN, and
  - an IEEE 802.11 Media Access Channel (MAC) protocol and an IEEE 802.11 Physical Layer (PHY) protocol utilized by the IEEE 802.11 WLAN; and
- identifying, by the WPTS, a co-channel, the IEEE 802.11 MAC protocol and the IEEE 802.11 PHY protocol to be implemented by the WPTS.

17. The method of claim 16, wherein the IEEE 802.11 MAC protocol supports a carrier-sense multiple access with collision avoidance (CSMA/CA) scheme employing a distributed coordination function, and the method further comprising:
- implementing, by the WPTS, the CSMA/CA scheme to support sharing of the co-channel,
- operating the WPTS as one of an IEEE 802.11 WLAN access point or an emulated IEEE 802.11 WLAN access point under which the IEEE 802.11 MAC and the IEEE 802.11 PHY protocols are implemented for management of access to the shared wireless medium environment using the CSMA/CA scheme.

18. The method of claim 16, wherein the frequency or the channel that overlaps the corresponding frequency or channel are a first frequency or a first channel, respectively, and further comprising:
- utilizing, by the WTPS, the co-channel, the IEEE 802.11 MAC protocol and the IEEE 802.11 PHY protocol to select WPTS time slots during which the WPTS is to access the shared wireless medium environment; and
- transmitting, by the WTPS, wireless power signals to the wireless power receiver device during at least some of the WPTS time slots, wherein the wireless power signals employ a second frequency or a second channel that overlaps with a co-channel frequency or the co-channel, respectively.

19. The method of claim 15, further comprising:

transmitting, by the WPTS, data to the wireless power receiver device or receiving, by the WPTS, transmissions from the wireless power receiver device during at least some of the WPTS time slots.

20. The method of claim 15, further comprising:

detecting, by the WPTS, a change in utilization of the shared wireless medium environment under which the corresponding channel that was being used by the data encoded-based wireless network becomes available; and transmitting, by the WPTS, power signals with the WPTS to the wireless power receiver device using at least one frequency within a radio band defined for the channel.

* * * * *